(12) United States Patent
Braddy et al.

(10) Patent No.: US 10,649,858 B2
(45) Date of Patent: May 12, 2020

(54) SYNCHRONIZATION STORAGE SOLUTION AFTER AN OFFLINE EVENT

(71) Applicant: SoftNAS, LLC, Houston, TX (US)

(72) Inventors: Rick Gene Braddy, Houston, TX (US); Benjamin Goodwyn, Cypress, TX (US)

(73) Assignee: SoftNAS, LLC., Houston, TX (US)

( * ) Notice: Subject to any disclaimer, the term of this patent is extended or adjusted under 35 U.S.C. 154(b) by 0 days.

(21) Appl. No.: 15/769,312

(22) PCT Filed: Oct. 21, 2016

(86) PCT No.: PCT/US2016/058135
§ 371 (c)(1),
(2) Date: Apr. 18, 2018

(87) PCT Pub. No.: WO2017/070480
PCT Pub. Date: Apr. 27, 2017

(65) Prior Publication Data
US 2018/0307568 A1    Oct. 25, 2018

Related U.S. Application Data

(60) Provisional application No. 62/244,961, filed on Oct. 22, 2015.

(51) Int. Cl.
*G06F 11/07* (2006.01)
*G06F 11/14* (2006.01)
(Continued)

(52) U.S. Cl.
CPC .......... *G06F 11/1464* (2013.01); *G06F 11/07* (2013.01); *G06F 11/0766* (2013.01);
(Continued)

(58) Field of Classification Search
CPC ...... G06F 11/07; G06F 11/0766; G06F 11/14; G06F 11/1441; G06F 11/1464;
(Continued)

(56) References Cited

U.S. PATENT DOCUMENTS 6,981,114 B1   12/2005   Wu et al.
6,983,295 B1   1/2006    Hart
(Continued)

FOREIGN PATENT DOCUMENTS

WO   2017070480 A1   4/2017

OTHER PUBLICATIONS

International Search Report and Written Opinion dated Apr. 27, 2017 for corresponding PCT Application No. PCT/US2016/058135.

*Primary Examiner* — Larry T MacKall
(74) *Attorney, Agent, or Firm* — Polsinelli PC

(57) ABSTRACT

Disclosed are systems and methods of synchronization between a source and a target. The synchronization relationship can be quickly and easily be created for disaster recovery, real-time backup and failover, thereby ensuring that data on the source is fully-protected at an off-site location or on another server or VM, for example, at another data center, a different building or elsewhere in the cloud. Common snapshots available on both the source and target can act as common recovery points. The common recovery points can be used to locate the most recent snapshot in common, between the source and target, to enable a delta sync of all subsequently written data at the source to the target after an offline event.

18 Claims, 17 Drawing Sheets

(51) Int. Cl.
*G06F 11/16* (2006.01)
*G06F 11/20* (2006.01)

(52) U.S. Cl.
CPC .......... *G06F 11/14* (2013.01); *G06F 11/1441* (2013.01); *G06F 11/1469* (2013.01); *G06F 11/1662* (2013.01); *G06F 11/2064* (2013.01); *G06F 11/2082* (2013.01); *G06F 11/2092* (2013.01); *G06F 11/2097* (2013.01); *G06F 11/2048* (2013.01); *G06F 2201/84* (2013.01)

(58) Field of Classification Search
CPC ............. G06F 11/1469; G06F 11/1662; G06F 11/2048; G06F 11/2064; G06F 11/2082; G06F 11/2092; G06F 11/2097; G06F 2201/84
See application file for complete search history.

(56) References Cited

U.S. PATENT DOCUMENTS

| | | | |
|---|---|---|---|
| 7,769,722 B1* | 8/2010 | Bergant | G06F 16/184 707/681 |
| 2004/0088331 A1* | 5/2004 | Therrien | G06F 11/1448 |
| 2005/0027749 A1* | 2/2005 | Ohno | G06F 11/1471 |
| 2007/0220059 A1* | 9/2007 | Lu | G06F 16/2358 |
| 2008/0046476 A1* | 2/2008 | Anderson | G06F 16/174 |
| 2008/0162590 A1 | 7/2008 | Kundu et al. | |
| 2015/0193454 A1 | 7/2015 | Peretz et al. | |

* cited by examiner

SYNCHRONIZATION STORAGE SOLUTION AFTER AN OFFLINE EVENT

CROSS-REFERENCE TO RELATED APPLICATION

This application is a U.S. National Stage Entry of PCT Application No. PCT/US2016/058135, filed Oct. 21, 2016, which claims priority to U.S. Provisional Application No. 62/244,961, filed Oct. 22, 2015, the contents of each are entirely incorporated by reference herein.

FIELD

The subject matter herein generally relates to providing synchronization storage solutions, and more specifically to synchronization between storage solutions after an offline event.

BRIEF DESCRIPTION OF THE DRAWINGS

Implementations of the present technology will now be described, by way of example only, with reference to the attached figures, wherein.

DETAILED DESCRIPTION

Figure 1:
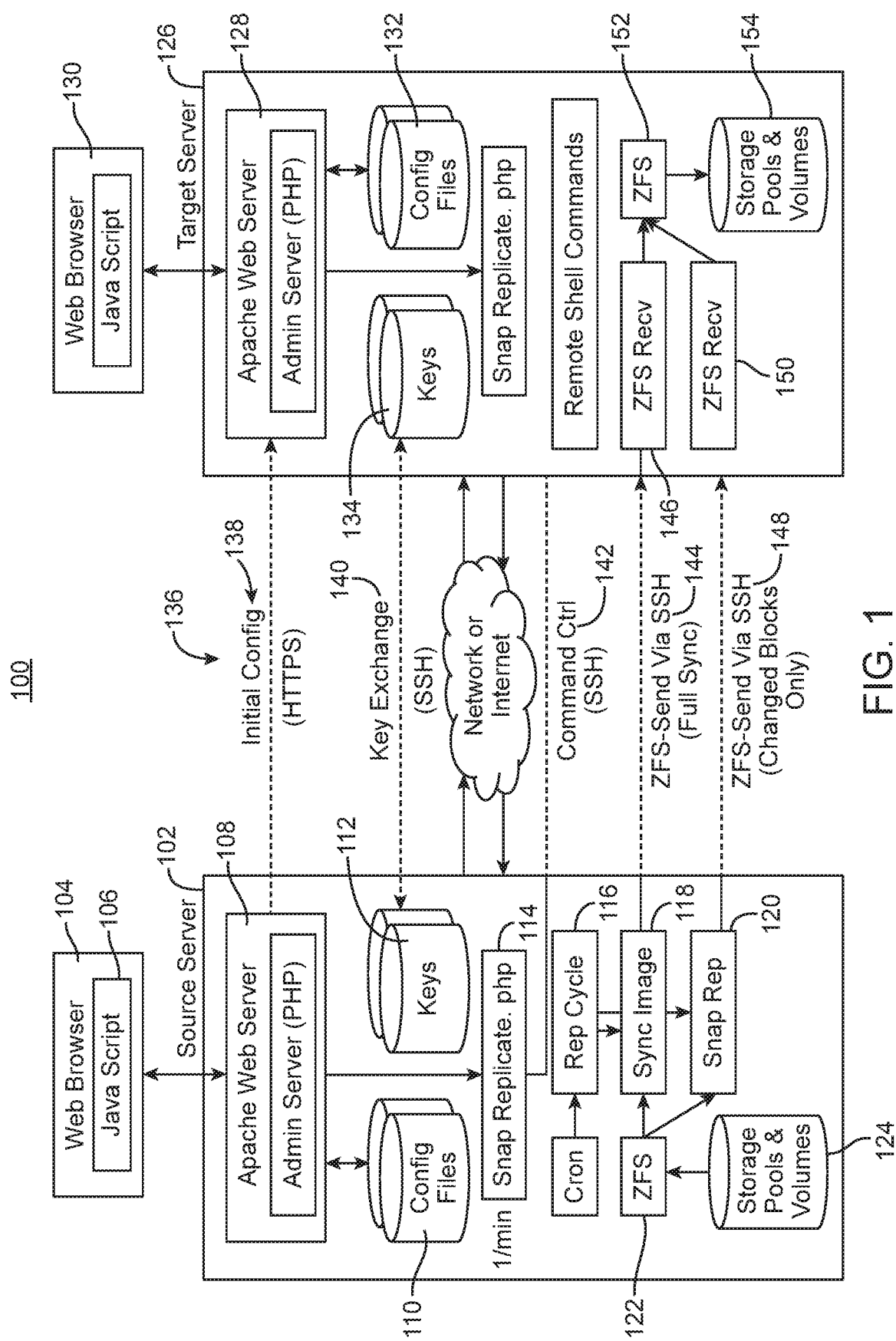
FIG. 1 is an example of a possible system architecture implementing the current disclosed subject matter.

For simplicity and clarity of illustration, where appropriate, reference numerals have been repeated among the different figures to indicate corresponding or analogous elements. In addition, numerous specific details are set forth in order to provide a thorough understanding of the implementations described herein. However, the implementations described herein can be practiced without these specific details. In other instances, methods, procedures and components have not been described in detail so as not to obscure the related relevant feature being described. Also, the description is not to be considered as limiting the scope of the implementations described herein.

Various examples of the disclosure are discussed in detail below. While specific implementations are discussed, it should be understood that this is done for illustration purposes only. The terms "e.g." and "i.e." are used to show specific examples for illustration and contextual purposes only and should not be considered limiting. As such, specific examples are not limiting, but merely provide a contextual basis for present disclosure. The present disclosure also includes the use of one or more of the examples, but not other ones of the examples. A person skilled in the relevant art will recognize that other components and configurations may be used without parting from the scope of the disclosure.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The term "comprising", which is synonymous with "including," "containing," or "characterized by" is inclusive or open-ended and does not exclude additional, unrecited elements or method steps. "Comprising" is a term of art used in claim language which means that the named elements are present, but other elements can be added and still form a construct or method within the scope of the claim.

Several definitions that apply throughout this disclosure will now be presented. The term coupled is defined as directly or indirectly connected to one or more components. The term server can include a hardware server, a virtual machine, and a software server. The term server can be used interchangeable with the term node. ZFS is a combined file system and logical volume manager designed by Sun Microsystems. The features of ZFS include protection against data corruption, support for high storage capacities, efficient data compression, integration of the concepts of file system and volume management, snapshots and copy-on-write clones, continuous integrity checking and automatic repair, RAID-Z and native NFSv4 ACLs. A pool is defined as one or more data storage devices such as disks aggregated to create a unit of storage. Secure Shell (SSH) is a cryptographic network protocol for secure data communication, remote command-line login, remote command execution, and other secure network services between two networked computers that connects, via a secure channel over an insecure network, a server and a client (running SSH server and SSH client programs, respectively). The protocol specification distinguishes between two major versions that are referred to as SSH-1 and SSH-2, both of which are comprised by SSH within this disclosure. Certain aspects of this disclosure pertain to public-key cryptography. Public-key cryptography, also known as asymmetric cryptography, is a class of cryptographic algorithms which requires two separate keys, one of which is secret (or private) and one of which is public. Although different, the two parts of this key pair are mathematically linked. The public key is used to encrypt plaintext or to verify a digital signature; whereas the private key is used to decrypt ciphertext or to create a digital signature. The term "asymmetric" stems from the use of different keys to perform these opposite functions, each the inverse of the other—as contrasted with conventional ("symmetric") cryptography which relies on the same key to perform both. Public-key algorithms are based on mathematical problems which currently admit no efficient solution that are inherent in certain integer factorization, discrete logarithm, and elliptic curve relationships. It is computationally easy for a user to generate their own public and private key-pair and to use them for encryption and decryption. The strength lies in the fact that it is "impossible" (computationally infeasible) for a properly generated private key to be determined from its corresponding public key. Thus the public key may be published without compromising security, whereas the private key must not be revealed to anyone not authorized to read messages or perform digital signatures. Public key algorithms, unlike symmetric key algorithms, do not require a secure initial exchange of one (or more) secret keys between the parties.

Disclosed are systems, methods and non-transitory computer-readable mediums for synchronizing a source server and a target server after an offline event. The system, methods and non-transitory computer-readable mediums can include retrieving, from a source server, a list of snapshots and determining a common snapshot between the source server and a target server. Also includes is, initiating a file update, reverting the source server to the common snapshot, and replicating, subsequent to the common snapshot, one or more snapshots from the target server to the source server. In some examples, when the common snapshot is not located initiate a full synchronization of the source server and the target server.

In some embodiments the systems, methods and non-transitory computer-readable mediums for synchronizing a source server and a target server after an offline event can include determining an offline event at the source node and promoting the target node to new source node, wherein the target node receives new write requests.

In some embodiments the systems, methods and non-transitory computer-readable mediums for synchronizing a source server and a target server after an offline event can include in response to the source node being online, subsequent the offline event, determining existence of a writable clone and in response to the writable clone existing, performing a file update.

In some embodiments the systems, methods and non-transitory computer-readable mediums for synchronizing a source server and a target server after an offline event can include building a file lists, from the source server, subsequent the common snapshot. The file list can include at least one of: (i) files modified on the source server and target server; (ii) files modified on the source server and unmodified on target server; (iii) files modified on the source server and do not exist on target server; and (iv) files modified on the source server and unmodified and locked on the target server.

In some embodiments the systems, methods and non-transitory computer-readable mediums for synchronizing a source server and a target server after an offline event can include processing the file list, generating a report based on the processing, and transmitting an alert comprising the report.

In at least one embodiment, the present technology can be implemented as a software module or a hardware module, or both. In at least one embodiment, the present technology causes a processor to execute instructions. The software module can be stored within a memory device or a drive. The present technology can be implemented with a variety of different drive configurations including Network File System (NFS), Internet Small Computer System Interface (iSCSi), and Common Internet File System (CIFS). Additionally, the present technology can be configured to run on VMware ESXi (which is an operating system-independent hypervisor based on the VMkernel operating system interfacing with agents that run on top of it. Additionally, the present technology can be configured to run on Amazon® Web Service in VPC.

The present technology is configured to provide fast and user-friendly ways to add powerful storage replication, backup and disaster recovery to data management systems. In at least one embodiment, the system of the present technology provides real-time block replication for failover and business continuity, and for site-to-site data transfers such as region-to-region data replicas across Amazon EC2 data centers or VMware failover across data centers.

In at least one embodiment, data is replicated from a source server to a target server. The present technology is configured for efficient scaling, which can enable it handle replication of millions of files quickly and efficiently.

Unlike conventional clustered file systems, at least one embodiment of the present technology uses block replication, which only sends the changed data blocks from source to target. This block replication avoids the need to do wasteful, resource-intensive file comparisons, since anytime a file's contents are updated, the copy-on-write file system keeps track of which data blocks have changed and only sends the changed blocks between two snapshot markers per a period of time, which can be one minute, or less.

The present technology is configured to enable fast and easy methods to quickly configure a complete replication and disaster recovery solution in very short periods of time, often no more than one. The automated methods within the technology avoid the need for complex scripting and detailed user-input and/or instructions.

In at least one embodiment of the present technology, replication can be configured between two controllers, a source server on the one hand, and a target server on the other. In at least one embodiment of the technology, a synchronization relationship between the source server and the target server is established. The synchronization relationship can be quickly and easily created for disaster recovery, real-time backup and failover, thereby ensuring that data on the source server is fully-protected at an off-site location or on another server or VM, for example, at another data center, a different building or elsewhere in the cloud. Processes described herein streamline the entire replication setup process, thereby significantly reducing error rates in conventional systems and making the replication process more user friendly than in conventional systems.

At least one embodiment of the present technology is a method of establishing a synchronization relationship between data storage nodes in a system. The method can include providing access to at least one source server via a user-interface, where the source server is configurable to store at least one source storage pool and at least one source volume. The method can also include receiving an internet protocol address of at least one target server, where the target server is configurable to store at least one target storage pool and at least one target volume. The method can also include: receiving log-in credentials corresponding to the at least one target server; providing access to the at least one target server, based on the received log-in credentials; and establishing a replication relationship between the nodes. Establishing a replication relationship can include: creating at least one public key; creating at least on private key;

authorizing two-way communication between the nodes via at least one secure shell; exchanging the at least one public key between the nodes; and confirming two-way communication between the nodes via at least one secure shell. The method can also include automatically discovering the information present on both nodes necessary to achieve replication; including determining at least which storage pools and volumes need to be replicated. Such determination can involve automatically discovering the storage pools on the nodes that have a same name; automatically discovering the volumes in each such storage pool; automatically configuring tasks necessary for each volume to be replicated; automatically determining whether a full back-up or synchronization from the source server to the target server of all storage pools and volumes in the source server is necessary; and executing the full back-up or synchronization from the source server to the target server of all storage pools and volumes in the source server, upon such determination. The method can also further include, performing a data replication once per minute. The data replication can involve synchronizing data on the source server to the target server which has changed within the last two minutes.

FIG. 1 is an example of a possible system 100 architecture implementing the current disclosed subject matter. A source server 102 is shown. The source server 102 can be in signal communication with a device running a web browser 104, which can be run using programs such as javasript 106. The web browser 104 can be used to implement command and instructions to, and receive information from, the source server 102. The source server 102 can include or be coupled to an Apache Web Server 108. As shown, the Apache Web Server can be coupled to a storage unit 110 storing one or more configuration files. Also within the source server 102 is at least one storage unit 112 storing keys, which can be public keys or private keys or both. As shown, the Apache Web Server 108 can control a snap replicate device or process 114. The snap replicate process 114 can be executed once every minute, as shown. Snap replication 114 can include a replication cycle, which can include a sync image process and a snap replicate process 120, as will be discussed below. The sync image process 118 and the snap replicate process 120 can be controlled by a file system and logical volume manager such as ZFS 122. ZFS 122 can manage the sync image process 118 and the snap replicate process 120 with regard to data in storage pools and volumes corresponding to the source server or source server 102.

Also shown in FIG. 1 is a target server (e.g., target server 126). The target server 126 can contain or be in communication with an Apache Web Server 128 and be in signal communication with a web browser. The target server 126 can contain or be coupled to a data storage unit 132 containing configuration files. The target server 126 can also contain or be coupled to a data storage unit 134 containing public keys or private keys or both. The Apache Web Server 128 can control snap replicate processes on the target server. The source server 102 and the target server 126 can be configured for two-way communication between them. Thus the Apache Web Server 108 corresponding to the source server 102 can send initial configuration instructions to the Apache Web Server 128 of the target server 128. Two-way communication 136 also enables the exchange of keys between the servers (102, 126). Two-way communication 136 also enables control commands 142 to be transmitted from the source server 102 to the target server 126. Two-way communication 136 further enables ZFS 122 to send full sync commands and data 144 to a ZFS receiver 146 on the target server 126 and enables ZFS 122 to send snap replicate commands and data 148 to a second ZFS receiver of the target server 126. A ZFS unit 152 of the target server 126 updates the storage pools and volumes 154 of the target server with the received ZFS data (144, 148), thereby synchronizing them with the storage pools and volumes 124 of the source server 102.

Figure 2:
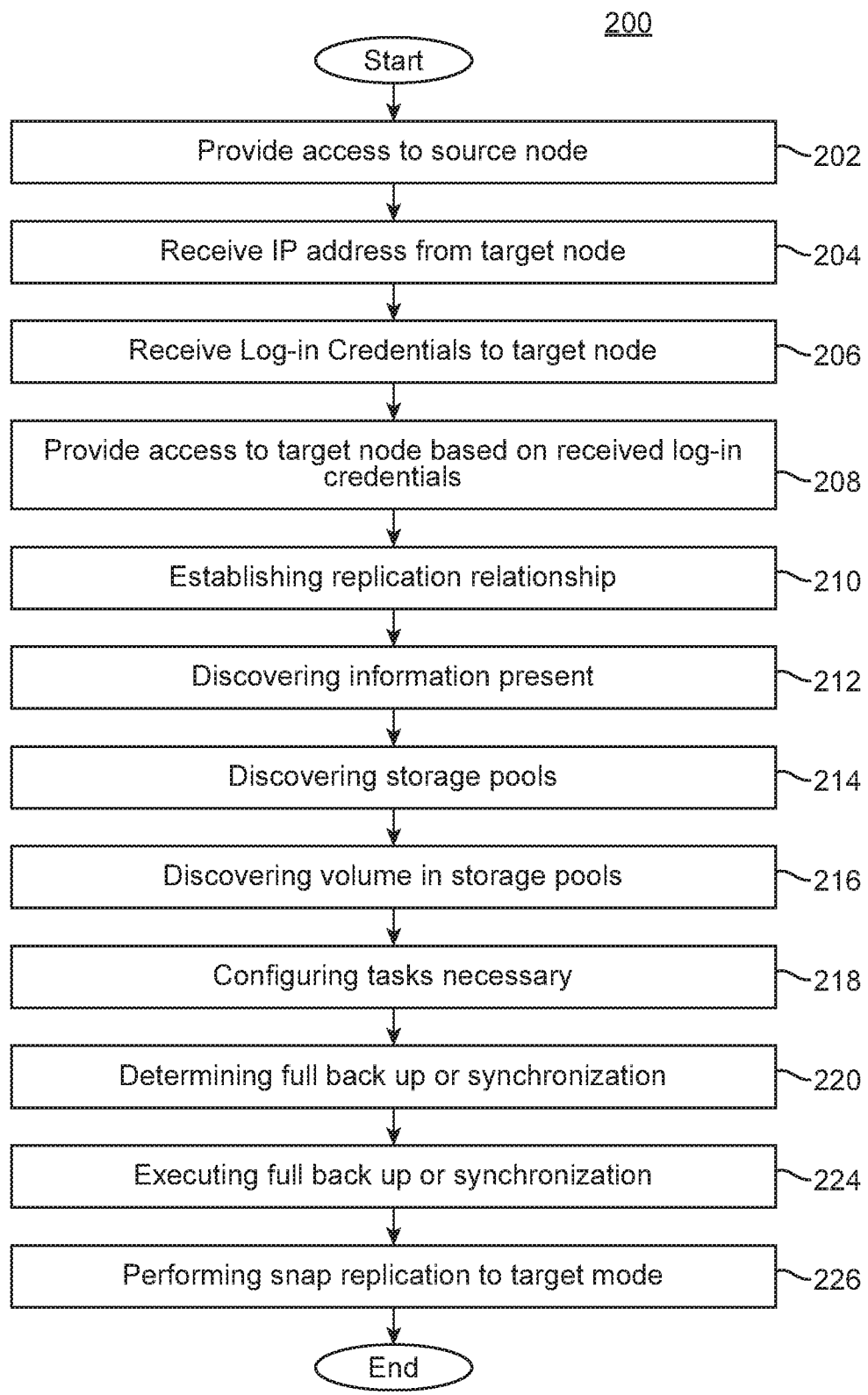
FIG. 2 is an example of a method according to the present disclosure.

The present disclosure also includes a method 200 as illustrated with respect to FIG. 2. As illustrated, the method includes several blocks. The blocks illustrated are for illustration purposes and other blocks can be implemented. Additionally, while a particular order is illustrated in FIG. 2, the present technology can be implemented in other arrangements such that the order of the blocks can be different than that as illustrated. Furthermore, the present technology can include blocks that are not illustrated and other embodiments can be such that one or more of the blocks are removed. The method is described in relation to two servers, which can be any device as described above. For example, the servers as described below can be network attached storage devices.

The method 200 comprises at block 202, providing access to at least one source server via a user-interface. The source server can be configurable to store at least one source storage pool and at least one source volume. After block 202 is completed, the method proceeds to block 204. Block 204 comprises receiving an internet protocol (IP) address of at least one target server. The target server can be configurable to store at least one target storage pool and at least one target volume. Once block 204 is completed, the method proceeds to block 206, which is the receiving of log-in credentials corresponding to the at least one target server. After correct log-in credentials are received, the method proceeds to block 208, which consists of providing access to the at least one target server, based on the received log-in credentials. After block 208 is completed, the method 200 proceeds to block 210, which comprises establishing a replication relationship between the nodes. Block 210 can include creating at least one public key, creating at least on private key, authorizing two-way communication between the nodes via at least one SSH, exchanging the at least one public key between the nodes, and confirming two-way communication between the nodes via at least one secure shell. Once block 210 is completed, the method 200 can proceed to block 212 which can include automatically discovering the information present on both nodes necessary to achieve replication, (including but not limited to) determining at least which storage pools and volumes need to be replicated. Determining begins at block 214, which can include automatically discovering the storage pools on the nodes that have a same name. Once block 214 is finished, the method 200 can proceed to block 216, which can include automatically discovering the volumes in each such storage pool. After block 216 is completed, the method 200 can proceed to block 218, which includes automatically configuring or establishing the tasks which are necessary for each volume to be replicated. Once block 218 is complete, the method 200 can proceed to block 220, which includes automatically determining whether a full back-up (or synchronization) from the source server to the target server of all storage pools and volumes in the source server is necessary. Once the determination of block 220 is completed, the method 200 proceeds to block 224, which includes executing the full back-up (or synchronization) from the source server to the target server of all storage pools and volumes in the source server, if necessary. At this point, the nodes can be considered synchronized. The method 200 then proceeds to block 226, which includes performing a data replication once per a first predetermined period (for example one minute), the data replication comprising synchronizing data on the source server to the target server which has changed within a second predetermined period (for example 2 minutes).

Figure 3:
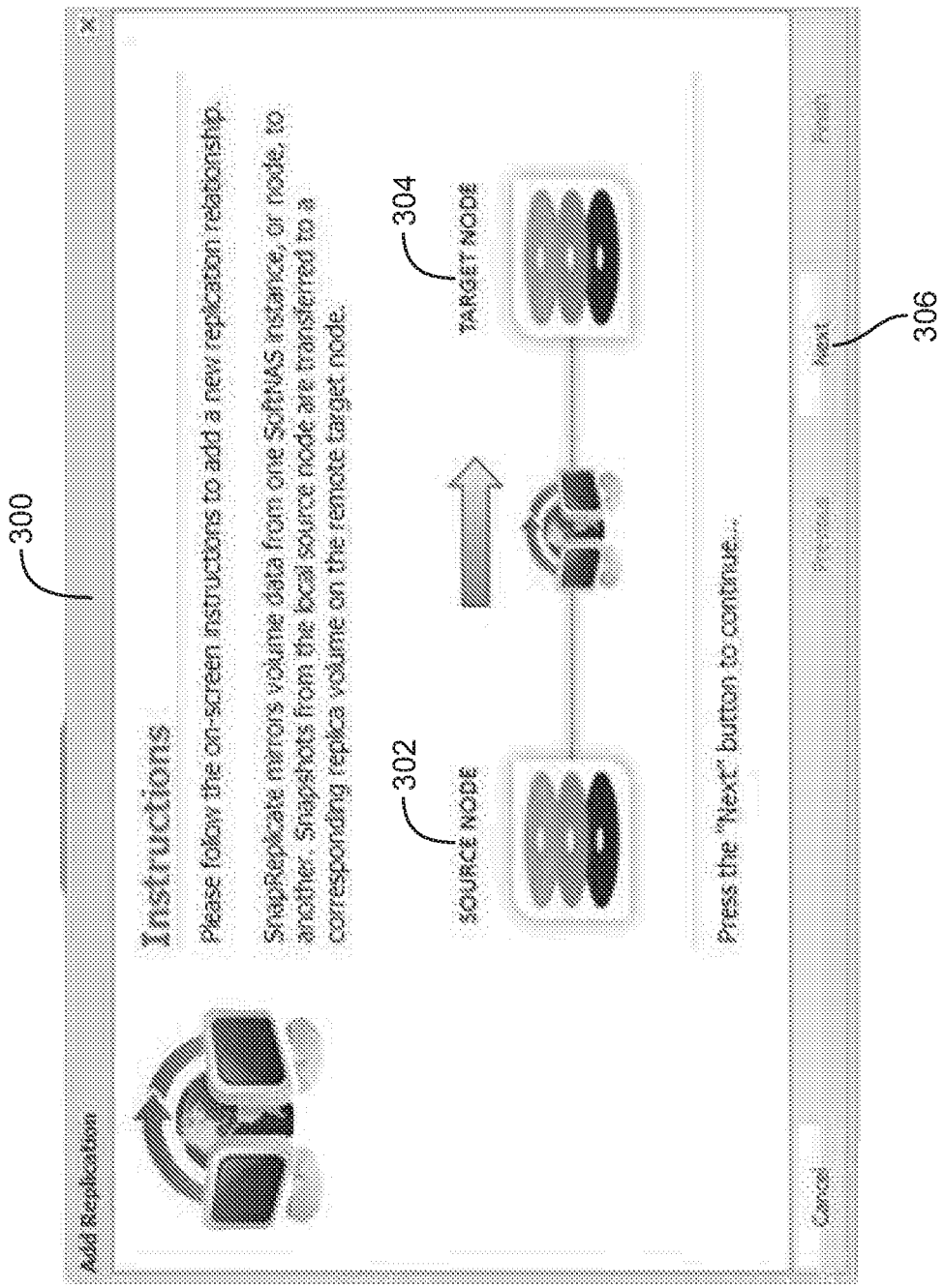
FIG. 3 through FIG. 10 illustrate example screen shots of a user-interface depicting aspects of this disclosure.
Figure 4:
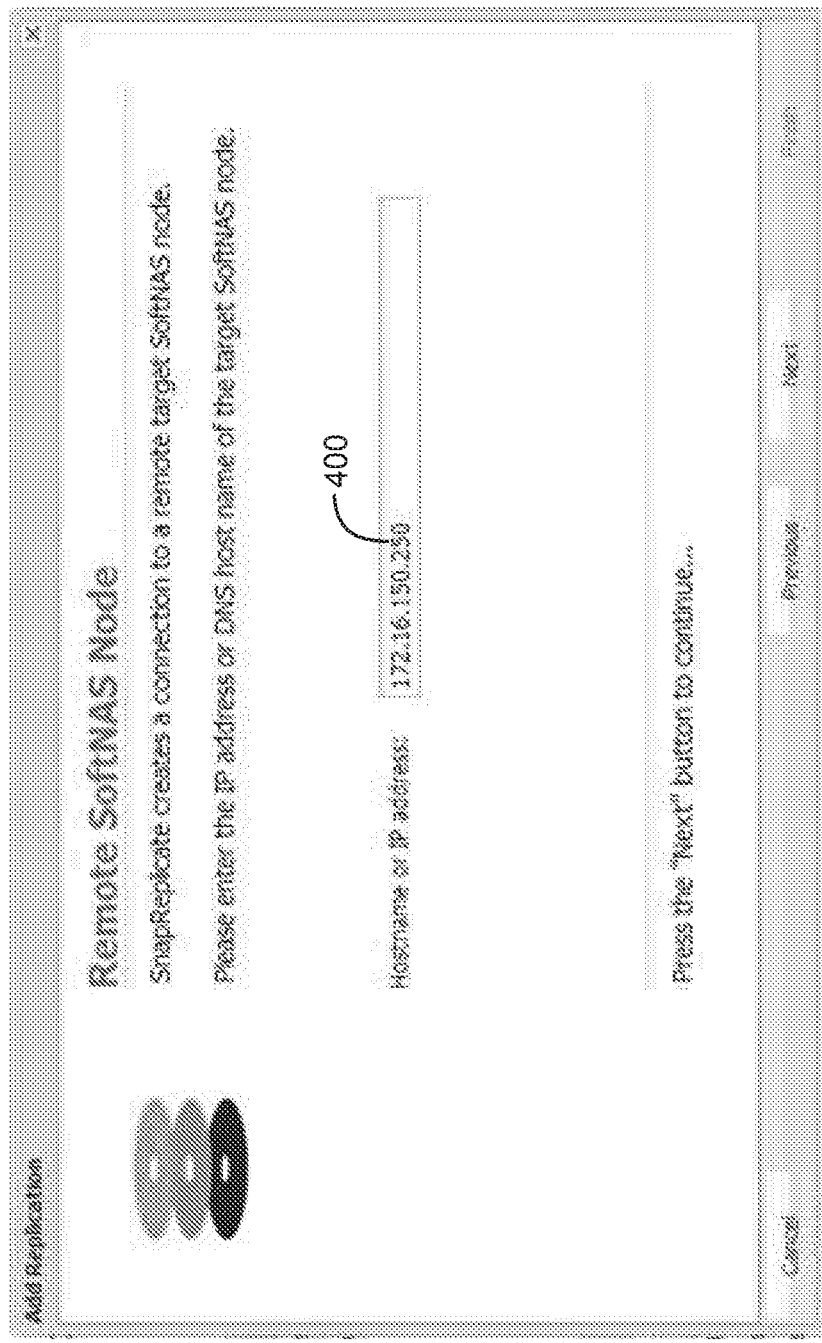
Figure 5:
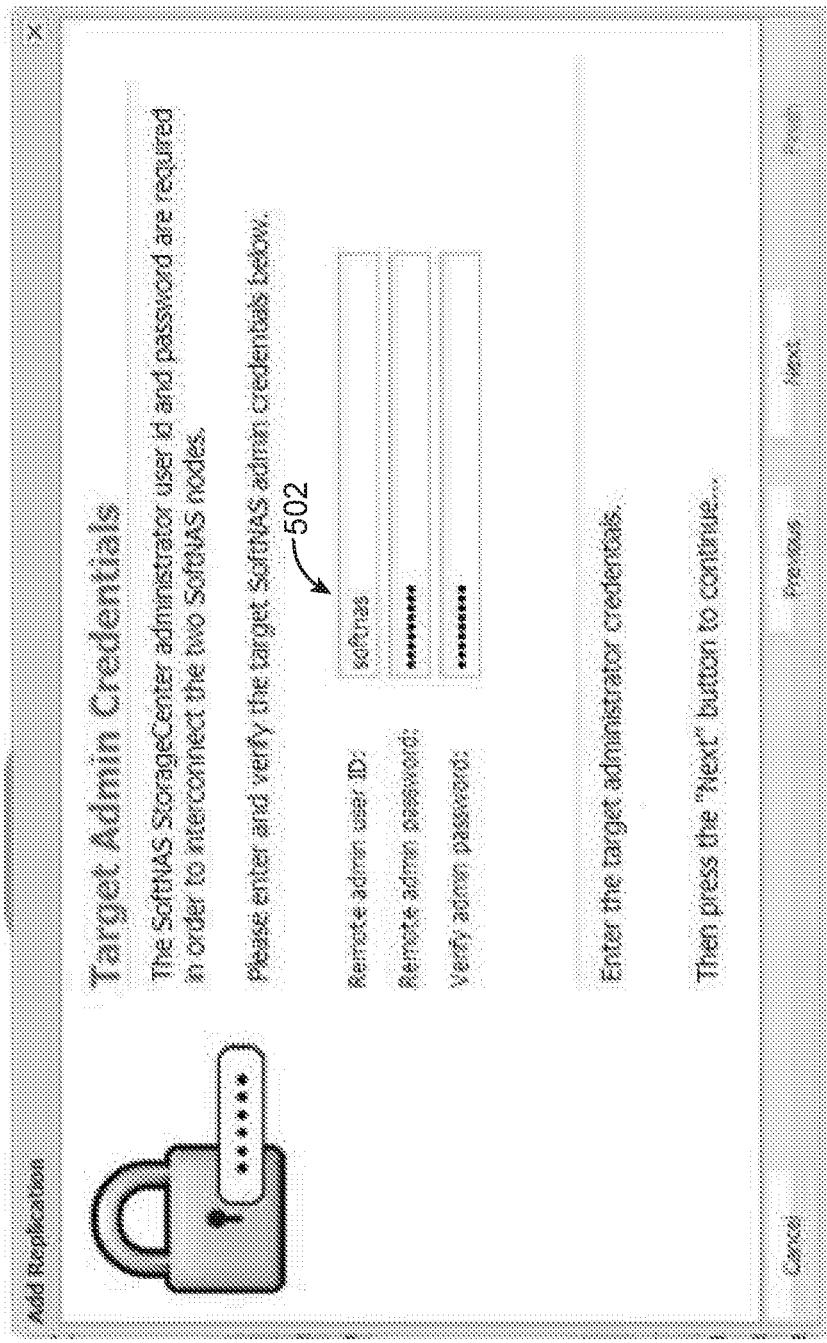
Figure 6:
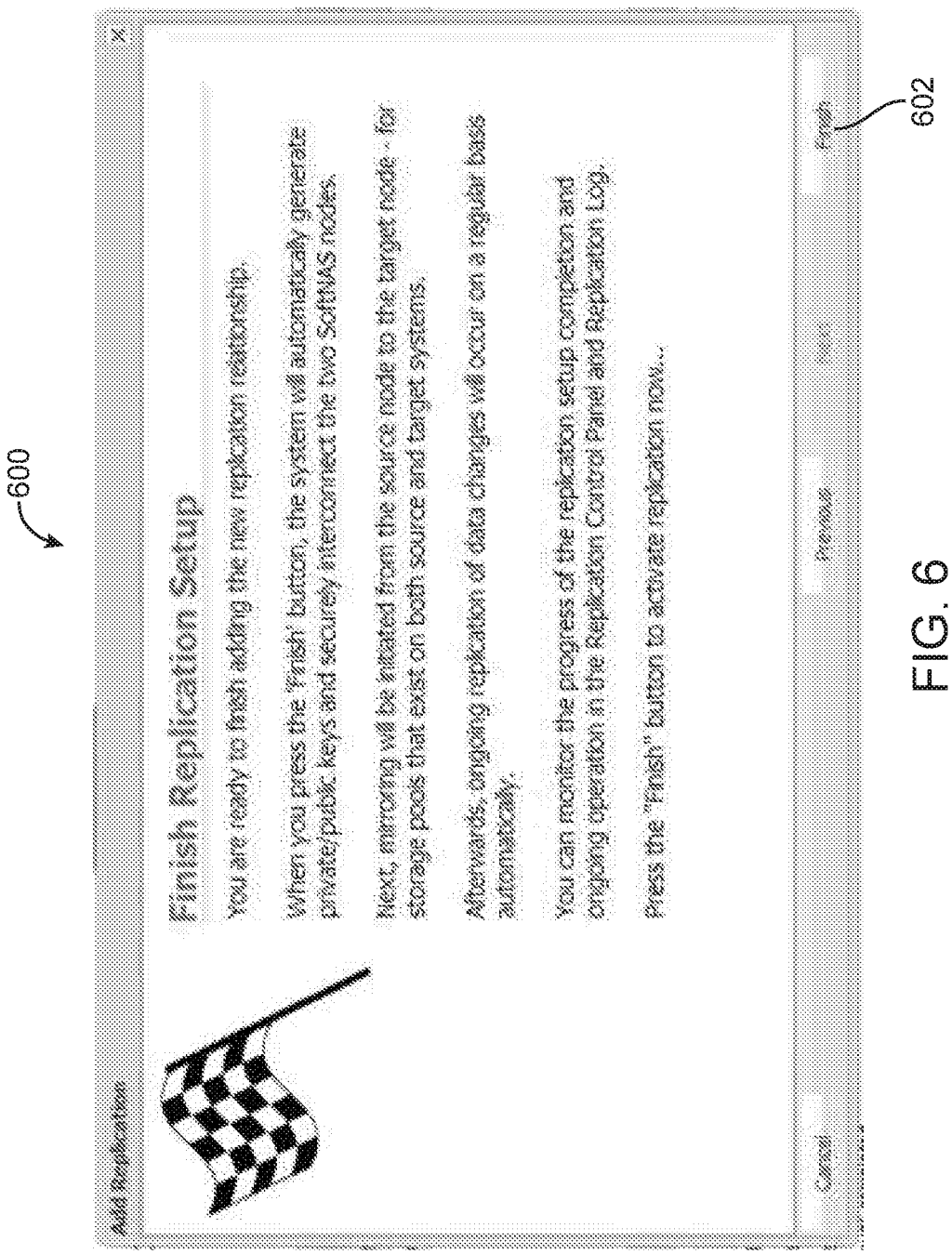
Figure 7:
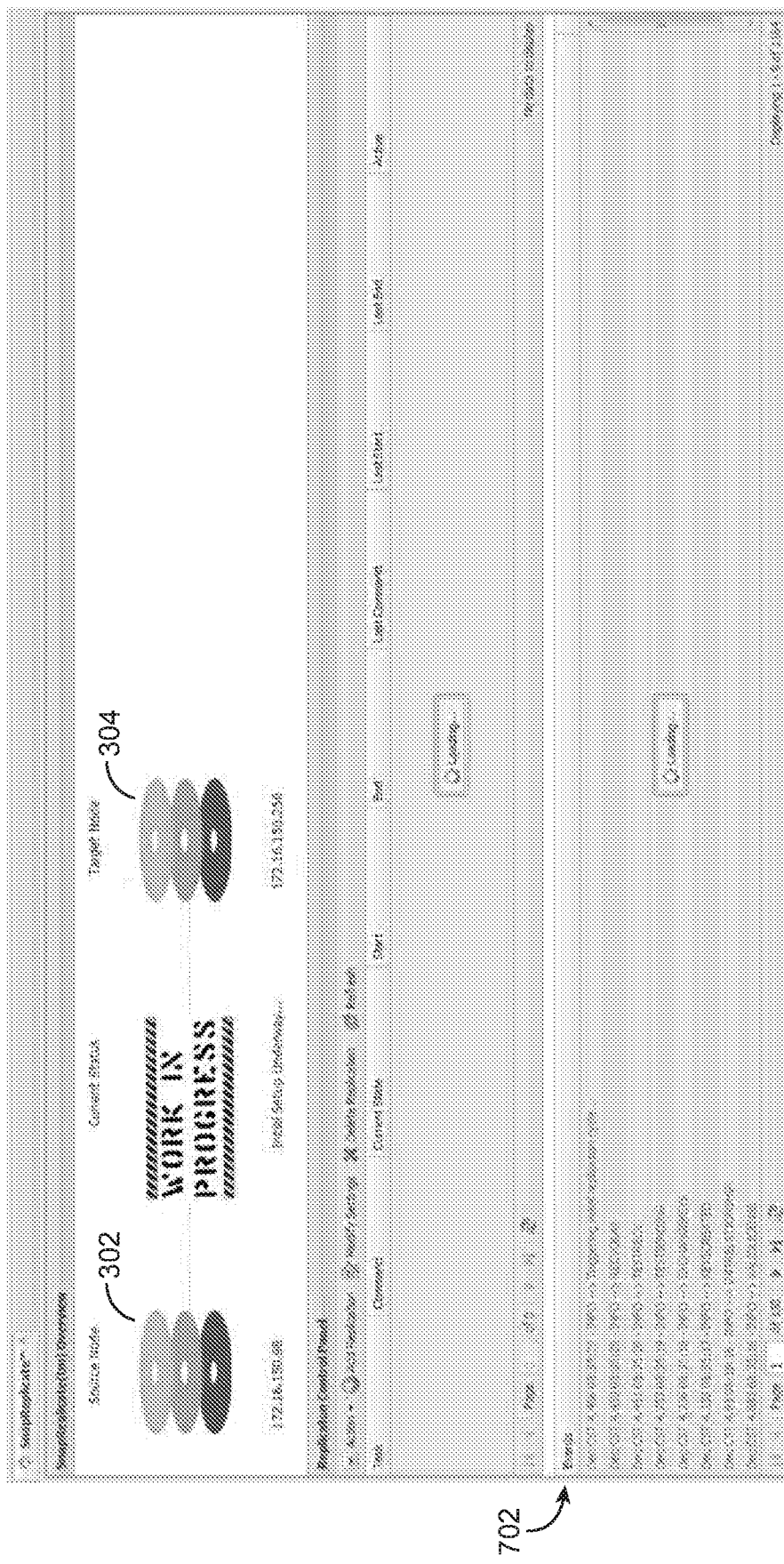
Figure 8:
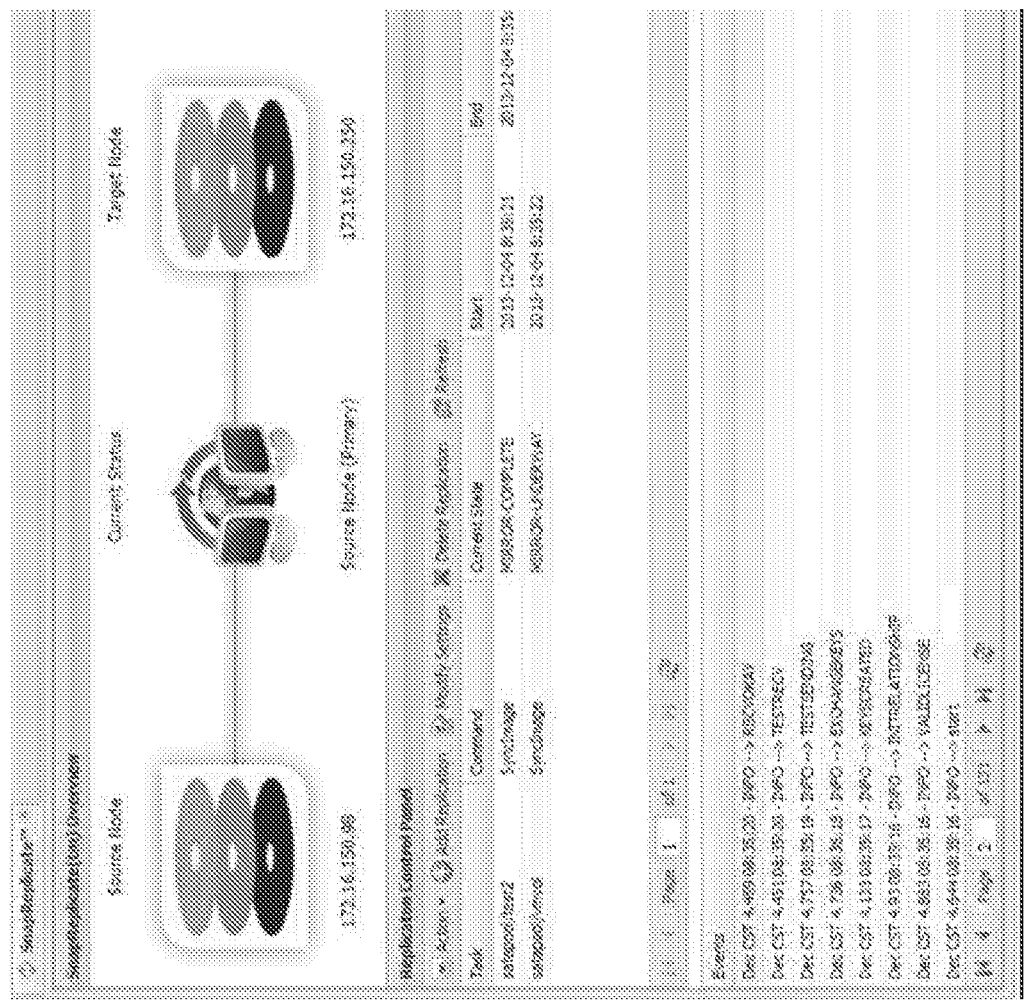
Figure 9:
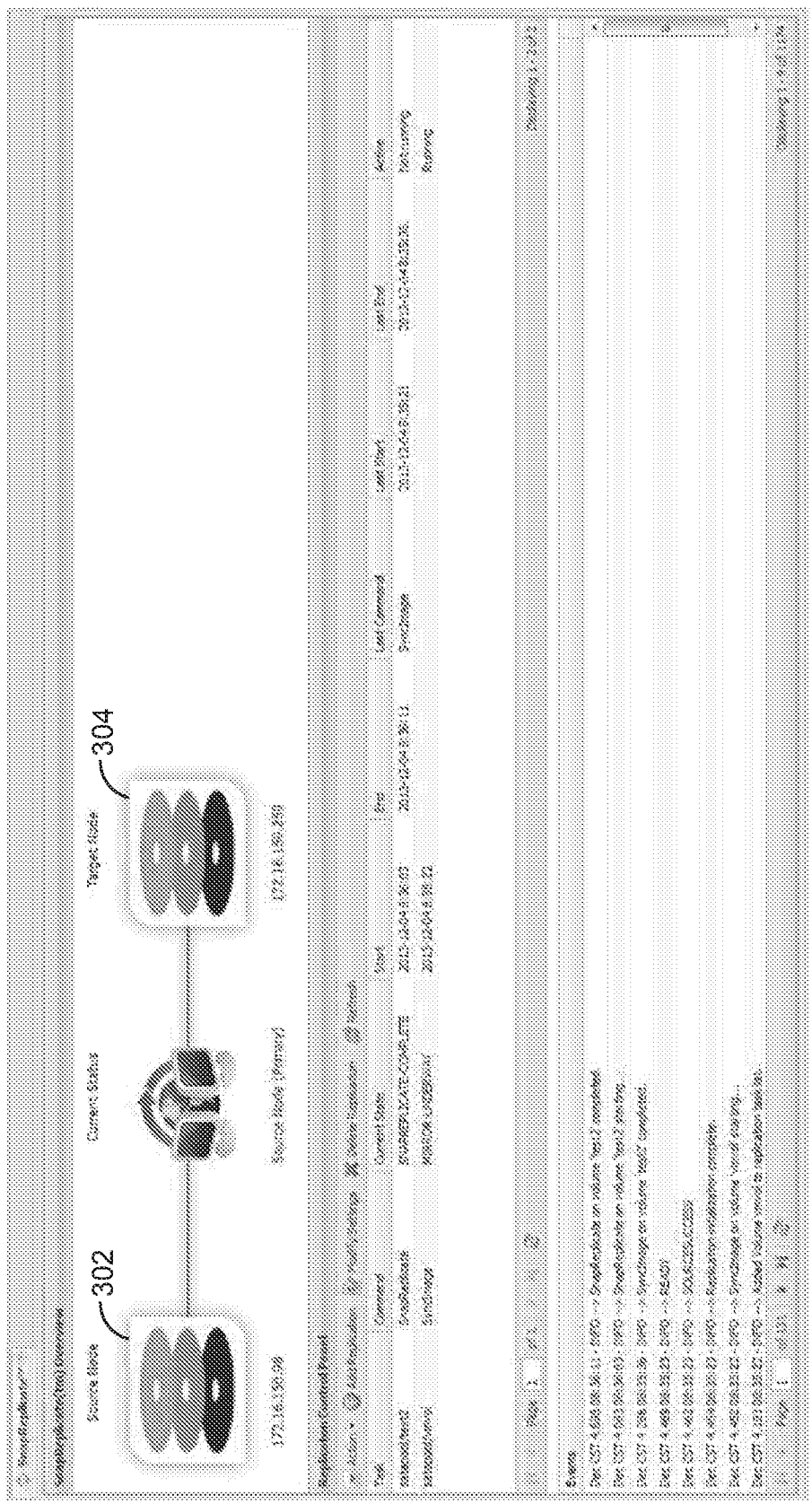
Figure 10:
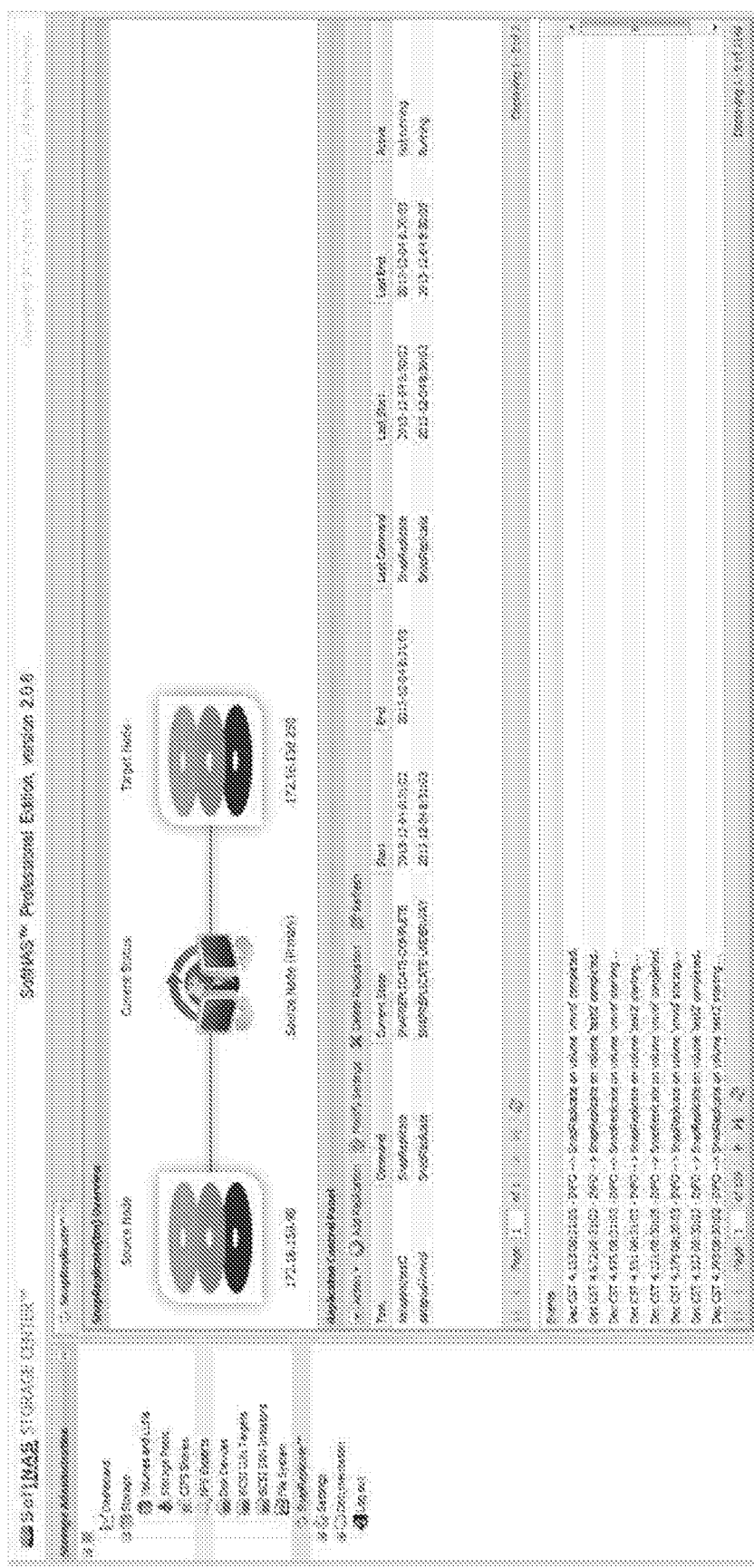

FIG. 3 through FIG. 10 illustrate example screen shots of a user-interface depicting aspects of this disclosure. FIG. 3 illustrates a user-interface 300 inviting a user to establish a replication relationship between a source server 302 and a target server 304. The user is invited to press the "next" button 306 to continue. FIG. 4 illustrates a user-interface rendered after button 306 has been pressed (or selected). As shown, the user can enter an IP address 400 for a desired target server 304. Once the IP address is entered and accepted, the user is invited to enter log-in credentials 502 for the target server 304, as shown in FIG. 5. Once the log-in credentials 502 are verified and accepted, the user-interface renders the image shown in FIG. 6. As shown in FIG. 6, once the user selects "finish" 602 replication of the source server 302 to the target server 304 can begin. No further action is required for replication. The simplicity, ease and speed with which replication can be established within this disclosure is advantageous. FIG. 7 illustrates a user-interface depicting initialization of a replication relationship between the source server 302 and the 304 target server. Various events 702 which occur during initialization are noted, as will be described in greater detail below. FIG. 7 illustrates a user-interface depicting the completion of the initialization of FIG. 6, as will be described below. FIG. 8 illustrates a user-interface depicting a snap replicate process, in which only those data elements which have changed in the last cycle on the source server 302 are replicated on the target server 304. FIG. 9 illustrates a user-interface depicting a complete snap replicate process (see FIG. 8). Aspects of FIG. 3 through FIG. 10 will be explained in greater detail in the discussions of FIG. 11 through FIG. 14 below.

Figure 11:
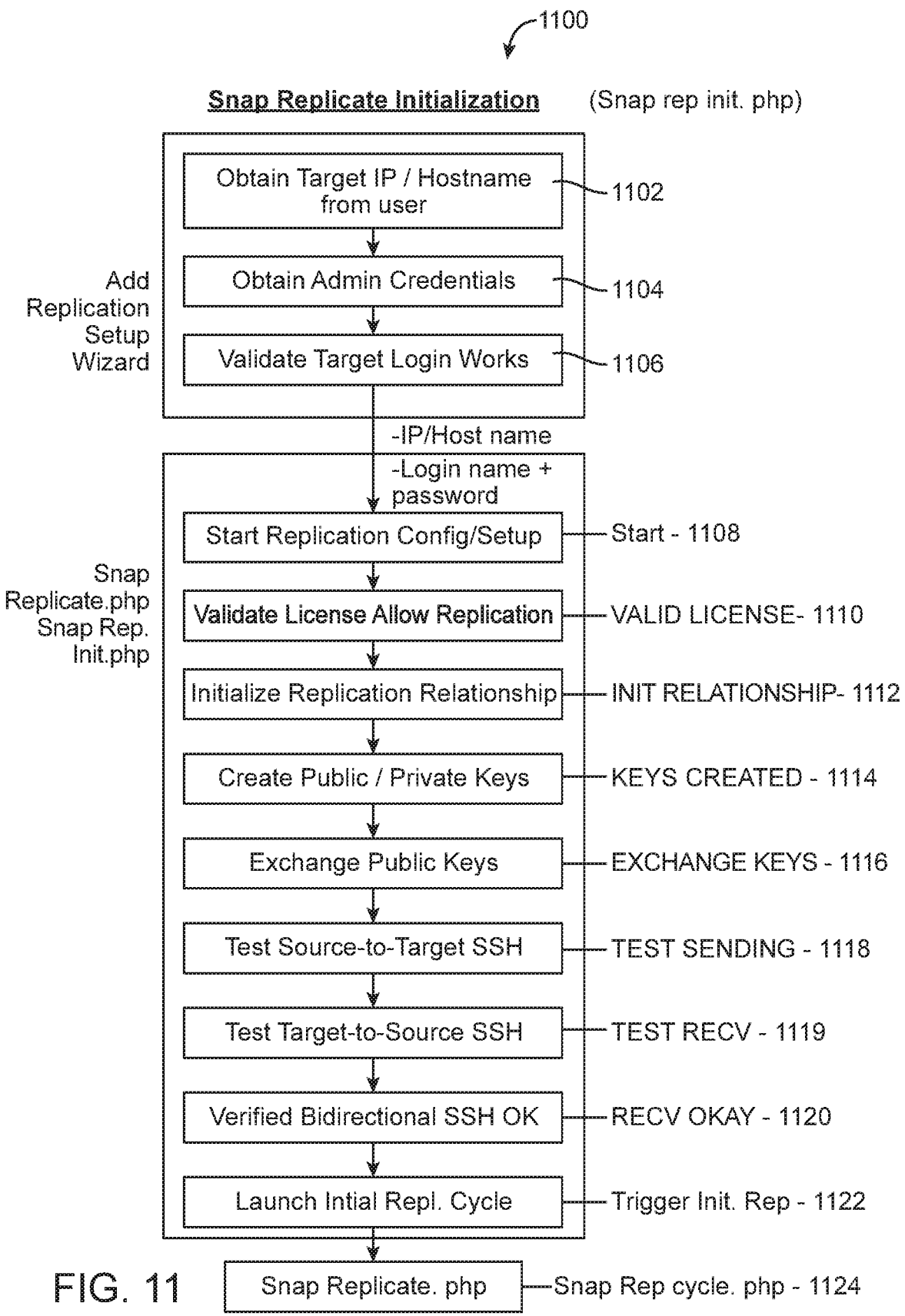
FIG. 11 illustrates a method of data replication initialization 1100 within this disclosure.

FIG. 11 illustrates a method of data replication initialization 1100 according to this disclosure. The method begins at block 1102, in which a target IP-address or hostname is received from user. Once this information is received, the method 1100 proceeds to block 1104, which includes obtaining administrative credentials for a target server 304. The method 1100 then proceeds to block 1106 in which log-in information for the desired target server 304 is validated. The method 1100 then proceeds to block 1108, in which the start of a replication is configured and setup. Once block 1108 is completed, the method 110 proceeds to block 1112, in which a user-purchased license is validated to allow replication. Once block 1112 is completed, the method 1100 proceeds to block 1112, in which the replication relationship between the nodes is initialized. Once the initialization is complete, the method 1100 proceeds to block 1114 in which appropriate public and private keys are created. The method 1100 then proceeds to block 1116, in which the created keys are exchanged. The method 1100 then proceeds to block 1118 in which a test communication is sent from the source server 302 to the target server 304. The method 1100 then proceeds to block 1119 in which a test communication is sent from the target server 304 to the source server 302. Bidirectional communication between the nodes via SSH is then verified (1120). The method 1100 then proceeds to block 1122, in which an initial replication cycle is launched. Thereafter, the method proceeds to block 1124, in which data replication cycles are performed, in which only recently changed data blocks are replicated (on the target server 304), as described above.

Figure 12:
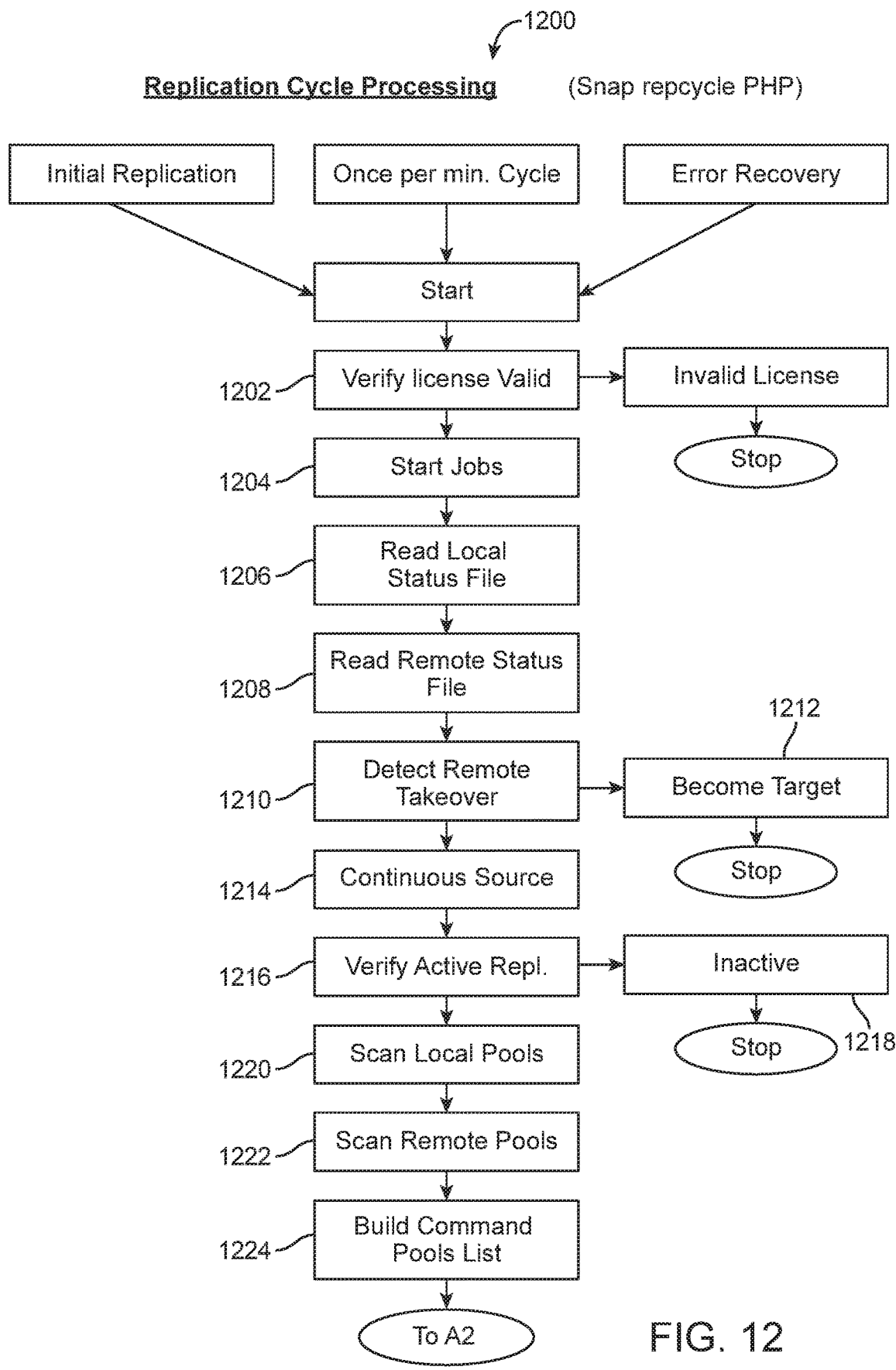
FIG. 12 and FIG. 13 illustrate a method 1200 of replication cycle processing within this disclosure.
Figure 13:
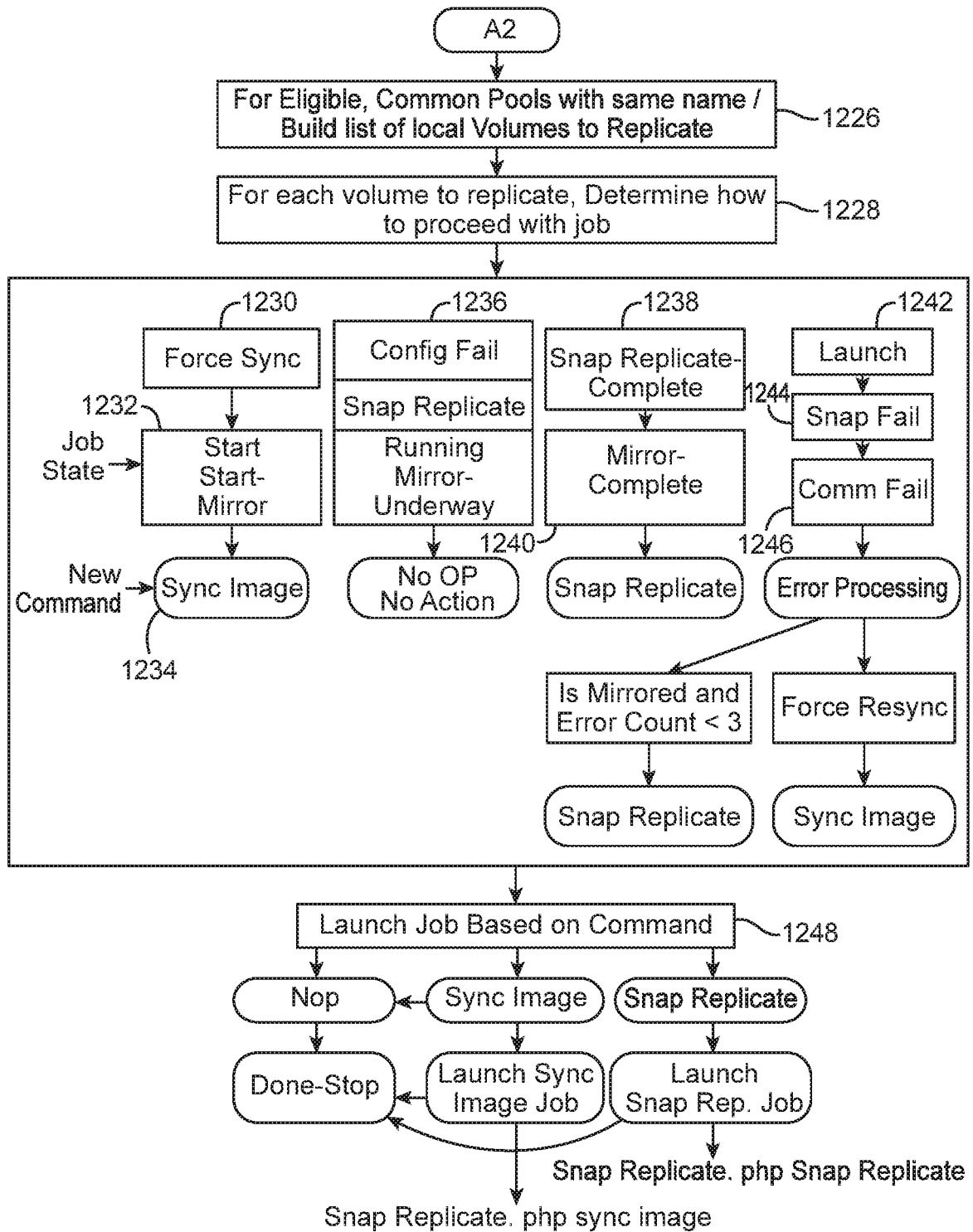

FIG. 12 and FIG. 13 illustrate a method 1200 of replication cycle processing within this disclosure. As indicated in FIG. 12, the cycle processing can occur once every minute 1201 and can incorporate error detection and recovery 1203 functions. The method 1200 begins by determining whether or not the relevant licenses are valid. If they are not valid, the method 1200 stops. If they are valid, the method 1200 continues to block 1204 in which relevant jobs are started. The method 1200 then proceeds to block 1206, in which local status files are read. Once block 1206 is completed, the method proceeds to block 1208 in which remote status files are read. The method 1200 can then proceed to block 1210, in which a remote takeover command can be detected. If a remote takeover command is detected, the source server can be established as a (virtual) target server 1212, and the method 1200 stops. If a remote takeover command is not received, the method 1200 can continue to block 1214, in which the source server continues to exist as a source server. The method then can continue to block 1216, in which it is determined if active replication is taking place. If it is not taking place, the source is considered to be inactive 1218 and the method stops. If active replication is verified, the method 1200 continues to block 1222 in which remote data pools are scanned. Once block 1222 is completed, a command pools list can be built at block 1224. Once block 1224 is completed, the method 1200 proceeds to block 1226, in which eligible common pools with the same name, a list of local volumes requiring replication is built. The method then proceeds to block 1228, in which, for each volume requiring replication (see block 1126), a determination is made as to how to proceed. The method can then proceed to block 1230 in which synchronization is forced 1230. After block 1230, a mirror image can be set up in block 1232. Thereafter, the image of one volume can be synchronized at block 1234. In the alternative, the method can proceed to block 1236, in which a determination is made that the configuration has failed. If this is because a mirroring action is already underway (see block 1232), no operation occurs. In the alternative, if a snap replicate action is complete 1238 and a mirroring action is complete, the method 1200 can perform a snap replicate action, as described herein. In the alternative, the method 1200 can attempt to launch a snap replicate action at block 1242. If this action fails 1244 or a communication fails 1246, error processing and recovery can be invoked. Error processing can involve running a forced resynchronization action 1247, as shown. Thereafter, the method 1200 can proceed to block 1248, in which various job based commands can be launched.

Figure 14:
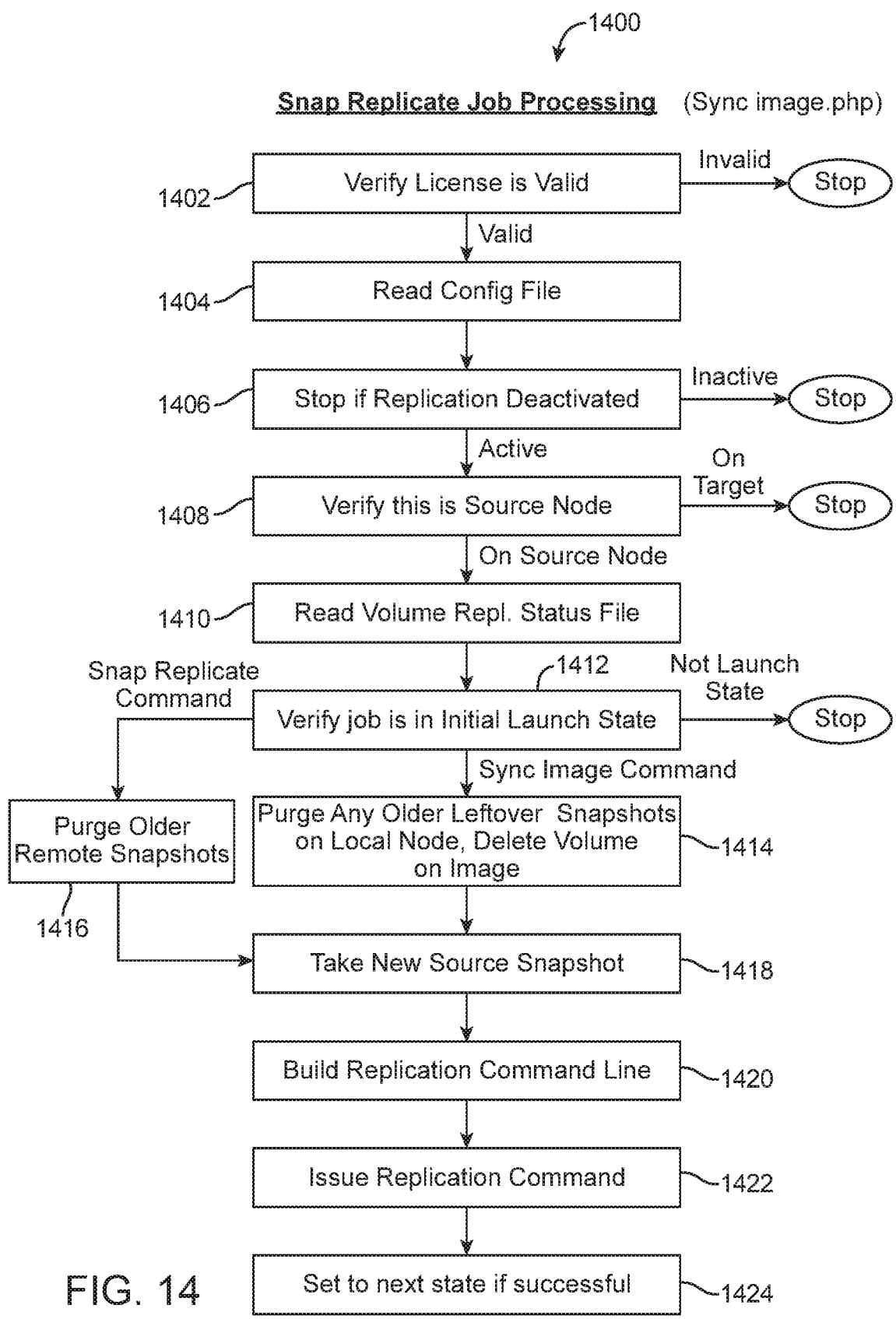
FIG. 14 illustrates an example method 1400 for running a data replication job within this disclosure.

FIG. 14 illustrates an example method 1400 for running a snap replication job within this disclosure. The method 1400 begins by verifying that the relevant licenses are valid at block 1402. If they are not valid, the method 1400 stops. If they are valid, a configuration file is read at block 1404. The method then proceeds to block 1406, where it is determined if the replication has been deactivated. If it has been deactivated, the method 1400 stops. If replication has not been deactivated, the method 1400 proceeds to block 1408, where it is determined if the node in question is a source server 302. If it is not, the method 1400 stops. If the node in question is a source server 302, the method 1400 proceeds to block 1410, in which a relevant volume replication status file is read. Thereafter, the method 1400 proceeds to block 1412, in which a determination is made as to whether the job is in an initial launch state. If it is not, the method 1400 stops. If the job is in an initial launch state, the method 1400 can execute a snap replicate command, causing the method 1400 to proceed to block 1416 in which remote snap shots are purged. In the alternative, the method can proceed to block 1414, in which any older leftover snapshots on a local node are purged and volumes on the image are deleted. After either block 1416 or block 1414 is completed, the method 1400 proceeds to block 1418, in which a new snap shot is taken of the source server 302. The method 1400 then proceeds to block 1420, in which at least one replication command line is build. The method 1400 then proceeds to block 1422 in a replication command is issued. If block 1422 is successfully completed, the method 1400 proceeds to block 1424, in which the system is set to the next appropriate state.

Figure 15:
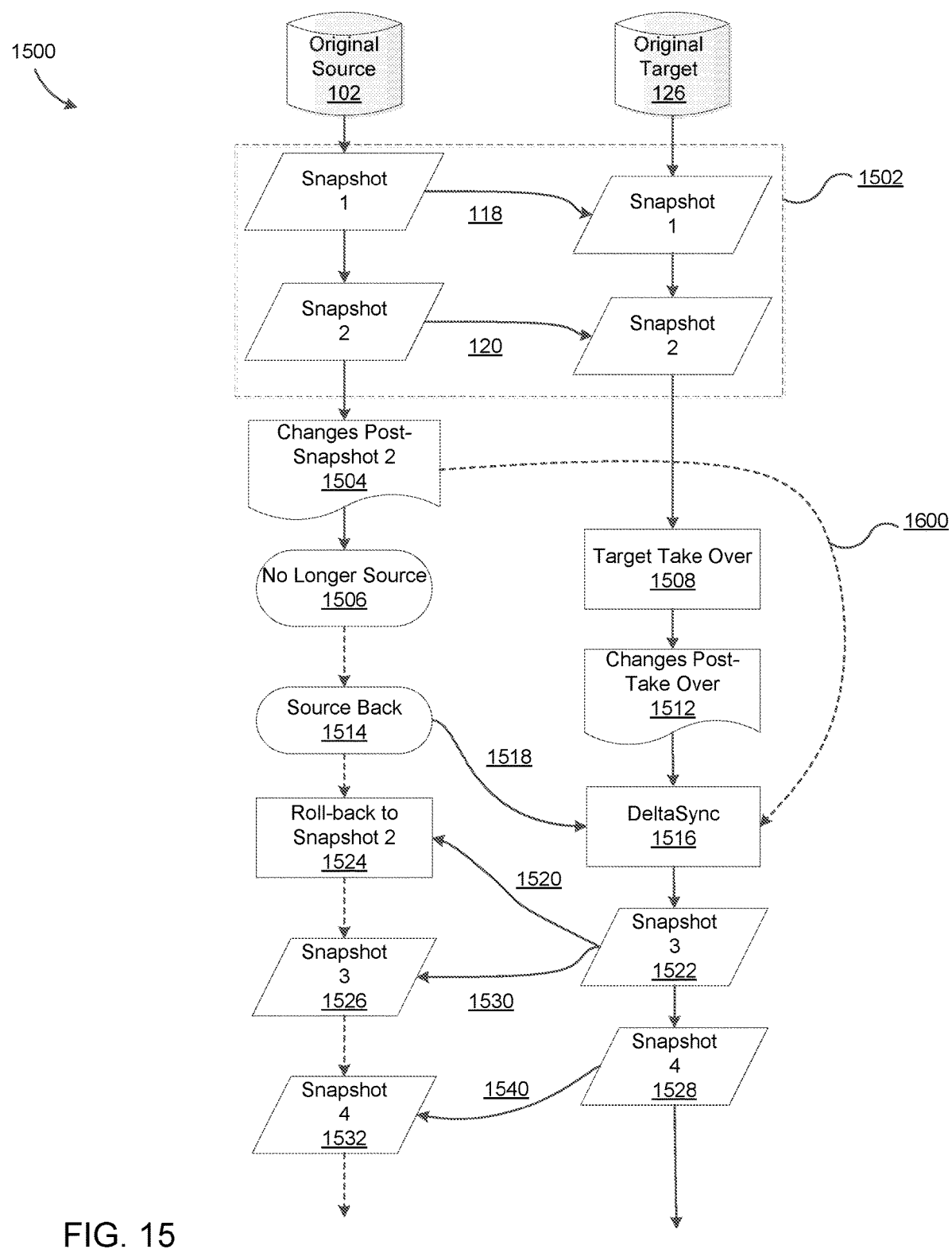
FIG. 15 illustrates an example method 1500 of a replication and delta sync replication within this disclosure.

FIG. 15 illustrates an example method 1500 of a data replication and delta sync replication. The method shown in FIG. 15 is provided by way of example, as there are a variety of ways to carry out the method. Additionally, while the example method is illustrated with a particular order of blocks, those of ordinary skill in the art will appreciate that FIG. 15 and the blocks shown therein can be executed in any order that accomplishes the technical advantages of the present disclosure and can include fewer or more blocks than illustrated.

Each block shown in FIG. 15 represents one or more processes, methods or subroutines, carried out in the example method. The blocks shown in FIG. 15 can be implemented on devices illustrated in FIG. 1 including source server 102 and target server 126. The flow chart illustrated in FIG. 15 will be described in relation to and make reference to at least the devices of FIG. 1.

FIG. 15 illustrates an example method 1500 of data replication and delta sync replication. Method 1500 can begin at an offline event at source server 102. Source server 102 and target server 126 can be in-sync (e.g., by using sync image 118 and snap replication 120) at block 1502. The replication process between the source server 102 and target server 126 can be asynchronous and performed at the block level. As previously discussed, sync image 118 and snap replication 120 can be asynchronous block level processes for synchronizing target server 126 with source server 102. Conversely, delta sync replication can be performed at the file level.

At block 1504 and upon an offline event at the source server 102 (e.g., power outage, system crash, natural or unnatural disaster, etc.) there can be data that was written to the source server 102 that has not yet been replicated to the target server 126. At block 1506, source server (e.g., 102) no longer receives active writes. At block 1508, original target server 126 takes over as the new source server (e.g., new writes are directed to the target server 126 (as the new source server). For example, the offline event at the source server 102 can trigger the target server 126 to take the role of the new source server (e.g., receive all new writes). The new source server (e.g., target server 126) can create a writeable clone of the last snapshot (e.g., snapshot 2).

At block 1512, original target server 126 (e.g., new source server) can receive all changes (e.g., new writes) post take over as the new source server. For example, original target server 126 can receive new writes and store them in the created writeable clone of the last snapshot.

At block 1514, the original source server 102 can come back online. The original source server 102 can notify original target server 126 that is has come back online at 1518. When the original source server 102 comes back online, target server 126 remains the new source server (e.g., still receives all new writes) and original source server 102 becomes the new target server (e.g., receives all replication writes from original target server 126).

At step 1516, the un-replicated data from original source server 102 (i.e., changes post-snapshot 2 at block 1504) can be written from the original source server 102, when it comes back online, using the delta sync replication method 1600. The delta sync replication is shown in detail at FIG. 16.

At block 1522, a new subsequent snapshot can be created (e.g., snapshot 3). For example, upon completion of the delta sync replication method 1600. The subsequent snapshot can then be snap replicated at 1530 to the new target server (e.g., original source server 102). At step 1526, the new subsequent snapshot (e.g., snapshot 3) can be created by snap replication. The creation of the subsequent snapshot (e.g., at the new source server 126) can start delta sync process at 1520.

At block 1524, delta sync replication (e.g., 1520) can configure the new target server (e.g., original source server 102) to roll-back to a previous snapshot (e.g., snapshot 2). For example, original source server 102 can roll back to a commonly shared snapshot between original source server 102 and original target server 126 before the offline event (e.g., snapshot 2). At this point in time, both the original source server 102 (e.g., new target server) and the original target server 126 (e.g., new source server) can be in sync, for example, like the offline event never occurred.

At block 1528, the new source server (e.g., original target server 126) can continue to operate as the source server (e.g., receiving new writes) and create more subsequent snapshots (e.g., snapshot 4), as described above. Subsequent snapshots can be replicated to the new target server (e.g., original source server 102) by snap replicate at 1540. At block 1532, the subsequent replicated snapshots can be stored at the new target server (e.g., original source server 102).

Figure 16:
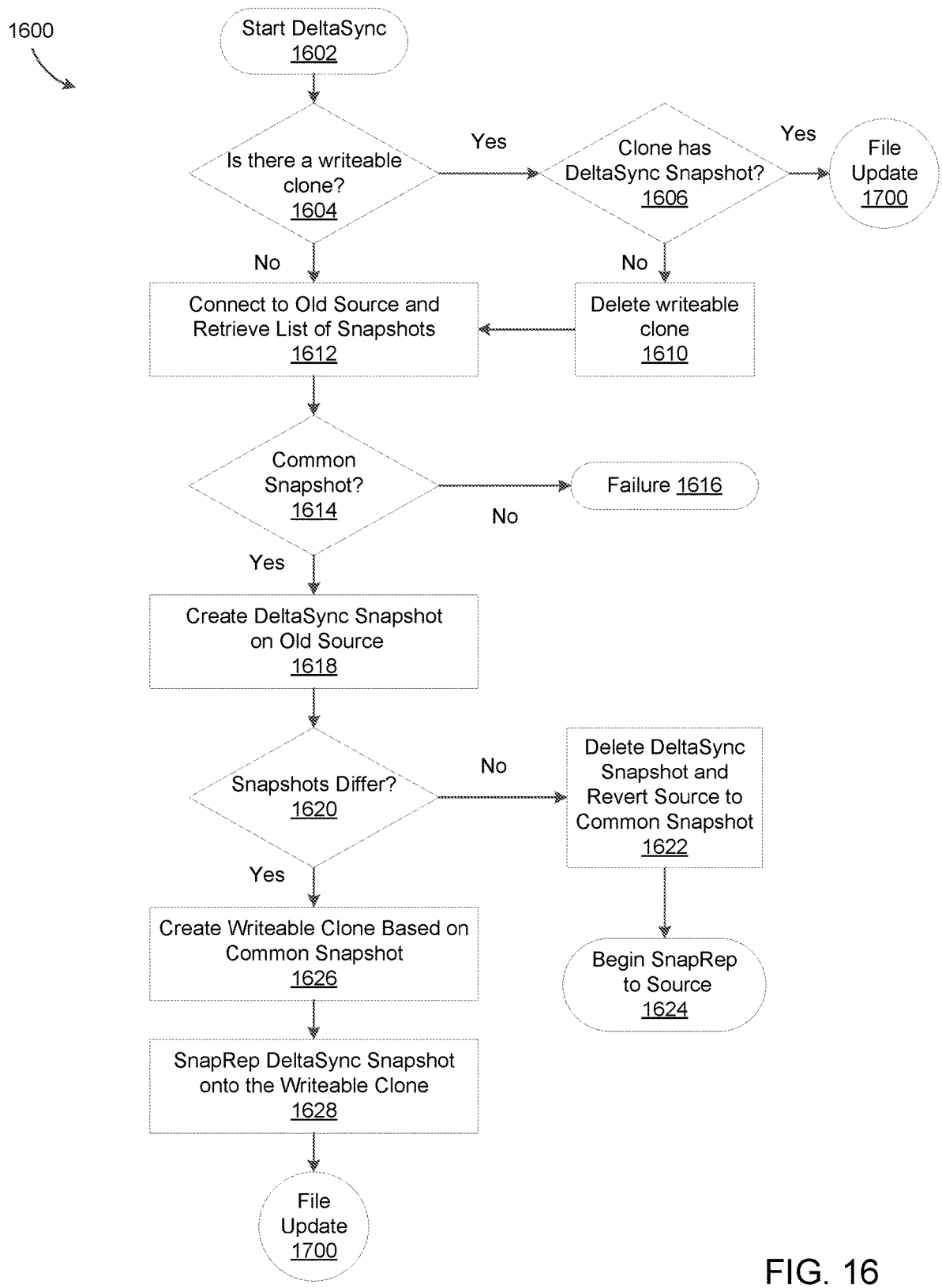
FIG. 16 illustrates an example method 1600 of a delta sync replication within this disclosure.

FIG. 16 illustrates an example method 1600 of a delta sync replication. Generally, a delta sync replication is a file level synchronization of files that have not yet been replicated (e.g., asynchronously) between a source and target, for example, due to offline event. The method shown in FIG. 16 is provided by way of example, as there are a variety of ways to carry out the method. Additionally, while the example method is illustrated with a particular order of blocks, those of ordinary skill in the art will appreciate that FIG. 16 and the blocks shown therein can be executed in any order that accomplishes the technical advantages of the present disclosure and can include fewer or more blocks than illustrated.

Each block shown in FIG. 16 represents one or more processes, methods or subroutines, carried out in the example method. The blocks shown in FIG. 16 can be implemented on devices illustrated in FIG. 1 include source server 102 and target server 126. While references to original source server 102 (also new target server) and original target server 126 (also new source server) will be made in method 1600, these denominations are made for simplicity. For example, an original source server is not necessarily the production server (i.e., receiving current writes of the system). In fact, once an offline event occurs and the original target server becomes the new source server for all production writes and reads. In some examples, the original source server does not reclaim production until an offline event occurs at the original target server (i.e., the new source server). In some embodiments, the original source server can become the production server (i.e., receive new read and write requests) after the original source server and original target server 126 (also the new source server) are synchronized. The flow chart illustrated in FIG. 15 will be described in relation to and make reference to at least the devices of FIG. 1.

The method 1600 of a delta sync replication can begin at block 1602 (as shown in FIG. 15 as 1600). For example, the delta sync replication can begin when both the original source server 102 and original target server 126 are back online (e.g., after an offline event).

At block 1604, a determination is made if a delta sync writable clone is available. For example, a writeable clone can be a writeable copy of the one or more snapshots. In some examples, the delta sync replication can determine if a previous delta sync replication had failed (e.g., if there is a previous writeable clone). If a delta sync writable clone is available, the method 1600 can proceed to block 1606. If a delta sync writable clone is not available, the method 1600 can proceed to block 1612.

At block 1606, a determination is made if the delta sync writable clone has a complete delta sync snapshot (e.g., the snapshot includes all files that had not been asynchronous replicated, block 1504 of FIG. 15). For example, the servers can determine differences between the snapshot (1) before the offline event and (2) when the original source 102 comes back online. In some examples, the differences can be determined using "diff" or "zfs diff." If the writeable clone is a completed snapshot, method 1600 can proceed to the delta sync file update at block 1700 (as further shown in FIG. 17). If the writeable clone is not a complete snapshot, the writeable clone can be deleted at block 1610 and the method can proceed to block 1612.

At block 1612, new source server (e.g., original target server 126), can connect (e.g., as shown in FIG. 1) to the new target server (e.g., original source server 102) to retrieve a list of ZFS snapshots (e.g., snapshot 1, snapshot 2, etc., and also shown in FIG. 15). The list of ZFS snapshots are snapshot that have been completed (e.g., snapshots that are read-only and not accepting new writes). If the list of ZFS snapshots cannot be retrieved, the method 1600 (e.g., delta sync replication) can end and a full snap replication can be initiated. Once the list of ZFS snapshots is successfully retrieved, the method 1600 can proceed to block 1614.

At block 1614, new source server (e.g., original target server 126) can determine if there is a common snapshot between new target server (e.g., original source server 102) and the new source server (e.g., original target server 126). For example, a common snapshot between the source server and target server can be determined by comparing the list of retrieved ZFS snapshots from the original source server and the ZFS snapshots stored at the original target server. In some embodiments, the common snapshot can be the most recently written common snapshot (e.g., between the original source server and original target server). If a common snapshot cannot be determined, the method 1600 can proceed to block 1616. At block 1616, the failure to find a common snapshot between the original source server and original target server ends method 1600 (e.g., delta sync replication) and a full snap replication can be initiated. If a common snapshot is determined, the method can proceed to block 1618.

At block 1618, a delta sync snapshot is created on the new target server (e.g., original source server 102). For example, the delta sync snapshot can include all data written to the original source server (e.g., 102) after the last completed snapshot (e.g., snapshot 2, as shown FIG. 15) and before the offline event (e.g., changes post-snapshot 2 1504, as shown in FIG. 15). After the delta sync snapshot is created the method 1600 can proceed to block 1620.

At block 1620, the delta sync snapshot is compared to the common snapshot. If there are differences between the delta sync snapshot and the common snapshot method 1600 can proceed to block 1626. In some examples, the differences can be determined at the block level (e.g., using zfs diff). In other examples, the difference can be determined at the file level. If the delta sync snapshot and common snapshot do not differ (e.g., include the same files), method 1600 can proceed to block 1622.

At block 1622, the delta sync snapshot can be deleted and the original source server (e.g., 102) can be reverted to the common snapshot. For example, the original source server can be rolled back to a point in time (e.g., snapshot 2) where the common snapshot is the last system event. In some examples, there were no new writes during the offline event. When the original source server (e.g., 102) has deleted the delta sync snapshot and reverted to the common snapshot the method 1600 can proceed to block 1624.

At block 1624, snap replication can be initiated from the new source server (e.g., original target server 126) to the new target server (e.g., original source server 102). For example, all writes to the new source server (e.g., original target server 126) since the offline event at the original source server (e.g., 102) can be replicated to the new target server (e.g., original source server 102). The snap replication (e.g., as shown in FIGS. 1 and 14), can be a block level replication. When the snap replication is initiated the method 1600 can end.

At block 1626, the new source server (e.g., original target server 126) creates a writable clone based on the common snapshot. For example, the writable clone can be configured to store the received data (e.g., changes post snapshot 2 1504, as shown in FIG. 15) from old source server (e.g., source server 102). In some examples, any data written to the original source server (e.g., 102) that had not yet been replicated to the original target server (e.g., 126) can be written to the newly created writeable clone on the new source server (e.g., original target server 126). When the writable clone has been created at the new source server (e.g., original target server 126), the method 1600 can move to block 1628.

At block 1628, the differences from block 1620 (e.g., changes post snapshot 2 1504, as shown in FIG. 16) can be transferred (e.g., snap replicated) to the writable clone created on the new source server (e.g., original target server 126). For example, the successful writing of the differences between the common snapshot and the original source server (e.g., 102) can provide the new source server (e.g., original target server 126) with a complete copy of all data written to the original source server (e.g., 102) that was written prior to the offline event and not yet replicated. After the successful delta sync replication, the new source server (e.g., target server 126) can contain all writes to either the original or new source server. When the differences are written to the writable clone at block 1628, the method can proceed to block 1700. At block 1700, method 1600 can initiate a delta sync file update as described in FIG. 17.

Figure 17:
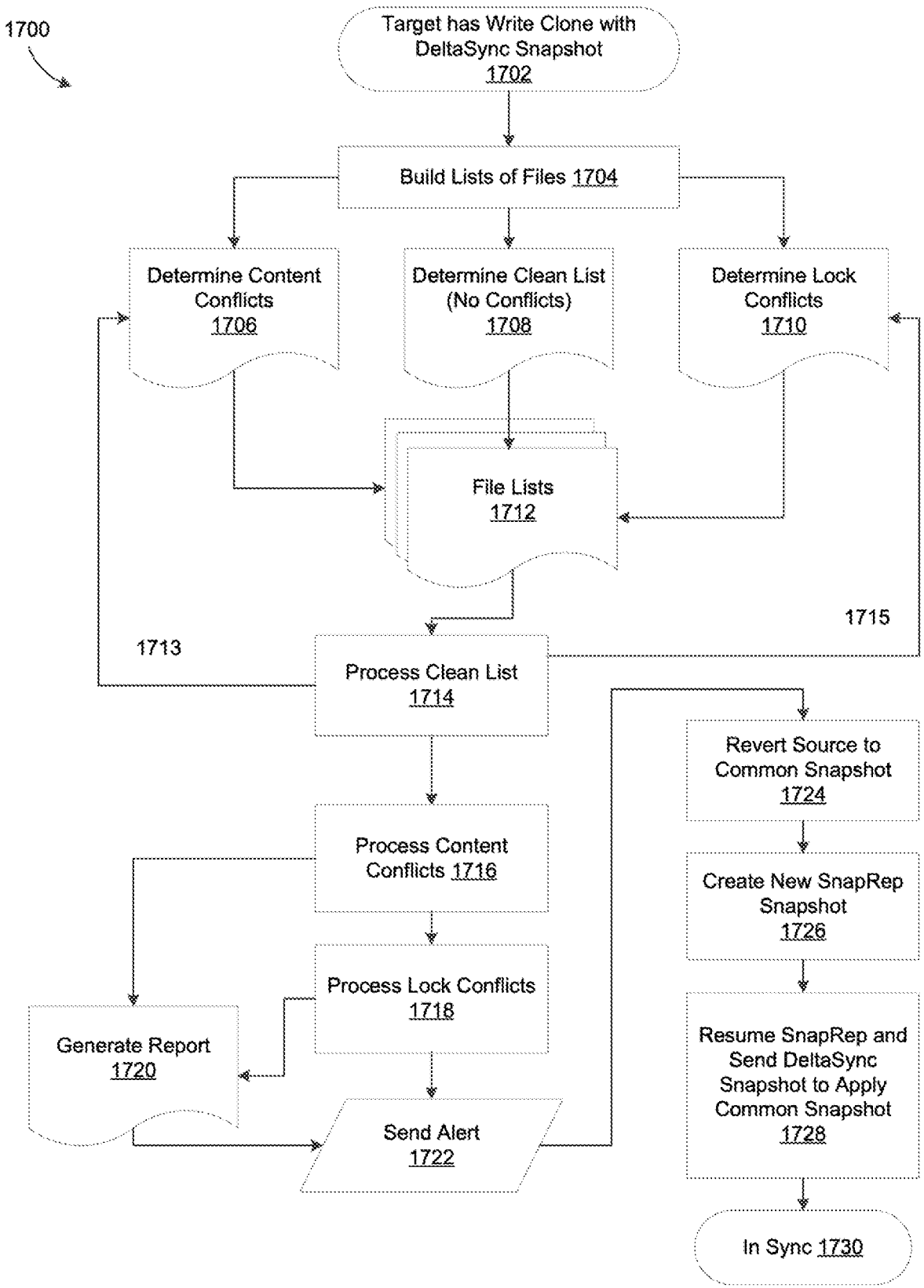
FIG. 17 illustrates an example method 1700 of a delta sync file updater within this disclosure.

FIG. 17 illustrates an example method 1700 of a delta sync file updater. The method shown in FIG. 17 is provided by way of example, as there are a variety of ways to carry out the method. Additionally, while the example method is illustrated with a particular order of blocks, those of ordinary skill in the art will appreciate that FIG. 17 and the blocks shown therein can be executed in any order that accomplishes the technical advantages of the present disclosure and can include fewer or more blocks than illustrated.

Each block shown in FIG. 17 represents one or more processes, methods or subroutines, carried out in the example method. The blocks shown in FIG. 17 can be implemented on devices illustrated in FIG. 1 including source server 102 and target server 126. In some examples, the delta sync file updater can determine the differences between the common snapshot and the ZFS file system on the original source server (e.g., 102) and can sync files to the new source server (e.g., original target server 126). The flow chart illustrated in FIG. 17 will be described in relation to and make reference to at least the devices of FIG. 1.

Method 1700 can begin at block 1702. At block 1702, the new source server (e.g., target server 126) can have a writable clone with a delta snapshot. For example, the writable clone can be configured to receive files that were not asynchronously snap replicated from the original source server (e.g., 102) before the offline event. The writeable clone can be a live volume (e.g., accepting new writes to new source server). Once a writable clone is configured on the new source server (e.g., original target server 126) at block 1702, the method 1700 can proceed to block 1704.

At block 1704, the original source server (e.g., 102) can run a ZFS diff to build a list of files. The list of files can be all files on the original source server (e.g., 102) written after to the common snapshot (block 1614 of FIG. 16). In some examples, the list of files can include three different categories: content conflicts files 1706 (e.g., files that have been modified on the both the original source and original target servers); clean files 1708 (e.g., files that have been modified on the original source server (e.g., 102) and unmodified or do not exist on the original target server (e.g., 126)); and lock conflict files 1710 (e.g., files that have been modified on the original source server (e.g., 102) and unmodified and locked (e.g., file lock) on original target server 126 (e.g., new source node). In some examples, the three categories of files can be a group of file lists 1712. In other examples, the three categories of files can be combined into a single file list. In some examples, if the files list 1712 cannot be successfully created (e.g., all files are not accounted for) the method 1700 can fail and the new source server (e.g., 126) can revert to a full block level synchronization. Once the file lists are compiled at 1712, the method can proceed to block 1714.

At block 1714, the file lists can be synced (e.g., written) to the new source server (e.g., original target server 126). For example, the files in the file lists can be transferred from the original source server (e.g., 102) to the new source server (e.g., original target server 126). In some examples, the files can be sent using rsync. As previously described, the file lists 1712 can included three categories of files. The clean files 1708 can be synced to the new source server (e.g., original target server 126) without conflicts. The content conflicts files 1706 and lock conflicts files 1710 can include conflicts between the original source server (e.g., 102) and new source server (e.g., original target server 126). In some examples, if at any of block 1714, 1716, or 1718 a sync of a file fails (e.g., not successfully transmitted to the new source server) the method 1700 can fail and the new source server can revert to a full block level synchronization.

If the files list 1712 includes content conflicts files 1706, the method can proceed to block 1716. If the files list 1712 includes clean files 1710, the method can proceed to block 1718. If the files list 1712 includes only files 1708, the method can proceed to block 1724.

At block 1716 content conflicts can be resolved. For example, the conflicts could be different content between files on the source and target or files on one server (e.g., original source) and not the other server (e.g., original target). In some examples, content conflicts can be when files have been modified on the original source server (e.g., 102) and the new source server (e.g., original target server 126) there is a content conflict between the files. In some examples, the modified file on the original source server (e.g., 102) can be written to the new source server (e.g., target server 126) with an alternate name. For example, if the original name of the file is file1.txt, the alternate name can be file1.txt.01. In other embodiments, timestamps can be included in the alternate name (e.g., file1.1476385956). After the content conflicts has been synced with alternate names, the method 1700 can moved to block 1720.

At block 1718, the lock conflicts can be resolved. For example, when files have been modified on the original source server (e.g., 102) and unmodified, and locked (e.g., file has restricted access—cannot be written to, read-only) on the new source server (e.g., target server 126) there is a lock conflict between the files. In some examples, the modified file on the original source server (e.g., 102) can be written to the new source server (e.g., target server 126) with an alternate name. For example, if the original name of the file is file1.txt, the alternate name can be file1.txt.01. In other embodiments, timestamps can be included in the alternate name (e.g., file1.1476385956). After the lock conflicts has been synced with alternate names, the method 1700 can moved to block 1720.

At block 1720, a report can be generated. For example, the report can include a files list (e.g., 1712) that had a conflict (e.g., content or lock) and the original and alternate names and stored locations of the files. If there are no conflicts, a delta sync report can be bypassed. After the delta sync report has been created the method 1700 can move to block 1722, where the report can be transmitted to a system administrator, for example as an alert or notification. In some examples, when there are no conflicts a report is not created and/or an alert is not transmitted. The method 1700 can then proceed to block 1724.

At block 1724, the new target server (e.g., original source server 102) can be reverted (or rolled back) to the common snapshot. For example, once all the files (e.g., changes post-snapshot 2 1504) have been written to the new source server (e.g., 126) the new target server (e.g., 102) can revert to the last common snapshot (e.g., block 1524 of FIG. 15) to order to synchronize the new source server and new target server. Once the new target server has been reverted to the common snapshot, the method 1700 can proceed to block 1726. At block 1726, the new source server (e.g., target server 126) can create a new snapshot (e.g., 1522 of FIG. 15). The new snapshot can receive all new writes (e.g., production writes) to the new source server (e.g., target server 126). When the new snapshot has been created the method 1700 can proceed to block 1728.

At block 1728, the new source server (e.g., original target server 126) can resume snap replication to the new target server (e.g., original source server 102). For example, all data written (e.g., during delta sync or production) to the new source server can be snap replicated to the new target server (e.g., 1530 of FIG. 15). For example, the newly created snapshot (e.g., snapshot 3 1522 of FIG. 15) can be replicated (e.g., 1530) to create the new snapshot (e.g., snapshot 3 1526 of FIG. 15) at the new target server (e.g., 102). When snap replication has been resumed and delta sync has completed the method 1700 can proceed to block 1730. At block 1730, the new source server (e.g., 126) and the new target server (e.g., 102) are in sync and method 1700 can end.

Examples within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, without departing from the scope of the disclosure.

What is claimed is:

1. A method for synchronizing a source server and a target server after an offline event at the source server, the method comprising:
    determining an offline event at a source server, wherein the source server and a target server were in a replication relationship prior to the offline event at the source server;
    retrieving, from the source server, a list of snapshots;
    determining a common snapshot between the source server and the target server;
    promoting the target server to new source server, such that the target server receives new write requests subsequent to the offline event and registers the new write requests in a clone of the common snapshot, thereby generating an updating common snapshot clone;
    in response to the source server coming back online, identifying un-replicated data that was written to the source server prior to the offline event but was not written to the common snapshot or replicated to the target server;
    generating a delta sync snapshot from the updated common snapshot clone generated by the target server and the un-replicated data from the source server;
    reverting the source server to the common snapshot; and
    replicating the delta sync snapshot from the target server to the source server, such that the target server, acting as new source server, is in a synchronized replication relationship with the source server, acting as new target server.

2. The method of claim 1, further comprising, in response to determining that the common snapshot could not be located, initiating a full synchronization of the source server and the target server.

3. The method of claim 1, further comprising:
    in response to the source server being online, subsequent the offline event, determining existence of a writable clone; and
    in response to the writable clone existing, performing a file update.

4. The method of claim 1, further comprising:
    building a file list, from the source server, subsequent the common snapshot.

5. The method of claim 4, wherein the file list comprises at least one of:
    files modified on the source server and target server;
    files modified on the source server and unmodified on target server;
    files modified on the source server and do not exist on target server; and
    files modified on the source server and unmodified and locked on the target server.

6. The method of claim 4, further comprising:
    processing the file list;
    generating a report based on the processing; and
    transmitting an alert comprising the report.

7. A system for synchronizing a source server and a target server after an offline event at the source server, the system comprising:
    a processor; and
    a memory storing instructions which when executed by the processor cause the processor to:
        determine an offline event at a source server, wherein the source server and a target server were in a replication relationship prior to the offline event at the source server;
        retrieve, from the source server, a list of snapshots;
        determine a common snapshot between the source server and the target server;
        promote the target server to new source server, such that the target server receives new write requests subsequent to the offline event and registers the new write requests in a clone of the common snapshot, thereby generating an updating common snapshot clone;
        in response to the source server coming back online, identify un-replicated data that was written to the source server prior to the offline event but was not written to the common snapshot or replicated to the target server;

generate a delta sync snapshot from the updated common snapshot clone generated by the target server and the un-replicated data from the source server;

revert the source server to the common snapshot; and replicate the delta sync snapshot from the target server to the source server, such that the target server, acting as new source server, is in a synchronized replication relationship with the source server, acting as new target server.

8. The system of claim 7, wherein the instructions further cause the processor to initiate a full synchronization of the source server and the target server in response to determining that the common snapshot could not be located.

9. The system of claim 8, comprising further instructions which when executed cause the processor to:

in response to the source server being online, subsequent the offline event, determine the existence of a writable clone; and in response to the writeable clone existing, perform a file update.

10. The system of claim 7, wherein the file update comprises:

building a file list, from the source server, subsequent the common snapshot.

11. The system of claim 10, wherein the file list comprises at least one of:

files modified on the source server and target server;

files modified on the source server and unmodified on target server;

files modified on the source server and do not exist on target server; and files modified on the source server and unmodified and locked on the target server.

12. The system of claim 10, comprising further instructions which when executed cause the processor to:

process the file list;

generate a report based on the processing; and transmit an alert comprising the report.

13. A non-transitory computer readable medium storing instructions which when executed by a processor cause the processor to:

determine an offline event at a source server, wherein the source server and a target server were in a replication relationship prior to the offline event at the source server;

retrieve, from the source server, a list of snapshots;

determine a common snapshot between the source server and the target server;

promote the target server to new source server, such that the target server receives new write requests subsequent to the offline event and registers the new write requests in a clone of the common snapshot, thereby generating an updating common snapshot clone;

in response to the source server coming back online, identify un-replicated data that was written to the source server prior to the offline event but was not written to the common snapshot or replicated to the target server;

generate a delta sync snapshot from the updated common snapshot clone generated by the target server and the un-replicated data from the source server;

revert the source server to the common snapshot; and replicate the delta sync snapshot from the target server to the source server, such that the target server, acting as a new source server, is in a synchronized replication relationship with the source server, acting as a new target server.

14. The non-transitory computer readable medium of claim 13, wherein when the common snapshot is not located the instructions cause the processor to initiate a full synchronization of the source server and the target server.

15. The non-transitory computer readable medium of claim 13, comprising further instructions which when executed cause the processor to:

in response to the source server being online, subsequent the offline event, determine existence of a writable clone; and in response to the writable clone existing, perform a file update.

16. The non-transitory computer readable medium of claim 13, wherein the file update comprises:

building a file list, from the source server, subsequent the common snapshot.

17. The non-transitory computer readable medium of claim 16, wherein the file list comprises at least one of:

files modified on the source server and target server;

files modified on the source server and unmodified on target server;

files modified on the source server and do not exist on target server; and files modified on the source server and unmodified and locked on the target server.

18. The non-transitory computer readable medium of claim 16, comprising further instructions which when executed cause the processor to:

process the file list;

generate a report based on the processing; and transmit an alert comprising the report.

* * * * *